United States Patent
Kaizuka et al.

(10) Patent No.: US 7,622,883 B2
(45) Date of Patent: Nov. 24, 2009

(54) CONTROLLER FOR MOTOR

(75) Inventors: Masaaki Kaizuka, Wako (JP); Hirofumi Atarashi, Wako (JP); Masanari Fukuchi, Wako (JP); Katsuhiko Furukawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 281 days.

(21) Appl. No.: 11/882,934

(22) Filed: Aug. 7, 2007

(65) Prior Publication Data

US 2008/0036415 A1 Feb. 14, 2008

(30) Foreign Application Priority Data

Aug. 9, 2006 (JP) ............................. 2006-216781

(51) Int. Cl.
*H02P 1/26* (2006.01)

(52) U.S. Cl. ..................... 318/730; 318/727; 318/721

(58) Field of Classification Search ................. 318/730, 318/727, 721, 400.02, 494, 801, 66, 811, 318/810, 809, 812, 805

See application file for complete search history.

(56) References Cited

U.S. PATENT DOCUMENTS 4,305,031 A 12/1981 Wharton 5,245,238 A 9/1993 Lynch et al.
6,563,246 B1 5/2003 Kajiura et al.
2004/0207475 A1* 10/2004 Minamino et al. ............ 331/16

FOREIGN PATENT DOCUMENTS

JP 2002-204541 7/2002

* cited by examiner

*Primary Examiner*—Karen Masih
(74) *Attorney, Agent, or Firm*—Arent Fox LLP

(57) ABSTRACT

There is provided a controller for a motor capable of changing the phase difference between two rotors that can prevent demagnetization of permanent magnets or the rotors. The motor has two rotors each having a permanent magnet and phase difference changing driving means for changing the phase difference between the rotors. The controller has a demagnetization determining means for determining whether or not demagnetization of the permanent magnets of the rotors occurs during operation of the motor, and rotor phase difference controlling means for controlling the phase difference changing driving means to change the phase difference between the rotors from a current phase difference to a phase difference that results in a higher strength of a composite field of the permanent magnets if the result of determination by the demagnetization determining means is positive.

5 Claims, 12 Drawing Sheets

CONTROLLER FOR MOTOR

BACKGROUND OF THE INVENTION

1. Field of the Invention

The present invention relates to a controller for a motor that has two rotors each having a permanent magnet to produce a field and can change the phase difference between the rotors.

2. Description of the Related Art

As a permanent magnet type motor, there has been known a double rotor type motor that has two rotors that are coaxially disposed and each have a permanent magnet for producing a field (for example, see Japanese Patent Laid-Open No. 2002-204541 (referred to as Patent Document 1 hereinafter)). In the motor of this type, the two rotors can relatively rotate with respect to each other about the axis thereof, and the phase difference between the rotors can be changed by the relative rotation. By changing the phase difference between the rotors, the strength of a composite field (the magnitude of magnetic fluxes) of the fields produced by the permanent magnets of the rotors can be changed.

The motor disclosed in the Patent Document 1 is mechanically configured so that the phase difference between the rotors changes according to the rotational velocity of the motor. That is, the rotors are connected to each other via a member that is displaced in the radial direction of the motor by the action of a centrifugal force. One of the rotors is capable of integrally rotating with the output shaft of the motor for outputting the torque produced by the motor to the outside. When the member described above is displaced, the other rotor relatively rotates with respect to the rotor capable of rotating integrally with the output shaft, and thus the phase difference between the rotors changes. In this case, the permanent magnets of the rotors are disposed in such a manner that, when the motor is halted, the directions of the magnetic poles (the directions of the magnetic fluxes) of the permanent magnets of the rotors are the same, and the strength of the composite field of the permanent magnets is maximized. As the rotational velocity of the motor increases, the phase difference between the rotors changes by the action of the centrifugal force, and the strength of the composite field of the permanent magnets of the rotors decreases.

The motor disclosed in the Patent Document 1 simply mechanically changes the phase difference between the rotors according to the rotational velocity of the output shaft. Therefore, for example, in an operational state where the rotational velocity of the output shaft is high, the phase difference between the rotors is such a phase difference that the fields of the rotors destructively interfere with each other. If such an operational state continues for a long time, demagnetization of the permanent magnets of the rotors is likely to occur. In addition, demagnetization of the permanent magnets of the rotors is likely to occur when the temperature thereof is excessively high. If such demagnetization occurs, the performance of the motor can be degraded, and it can be difficult to make the motor operate in a desired way.

SUMMARY OF THE INVENTION

The present invention has been made in view of such circumstances, and an object of the present invention is to provide a controller for a motor capable of changing the phase difference between two rotors that prevents demagnetization of permanent magnets of the rotors.

In order to attain the object described above, according to the present invention, there is provided a controller for a motor that has a first rotor, a second rotor, each of which produces a field (or a magnetic field made of a field) by a permanent magnet, and an output shaft capable of rotating integrally with the first rotor of the rotors, which are coaxially disposed, the second rotor being capable of relatively rotating with respect to the first rotor, and the strength of a composite field of the fields of the permanent magnets of the rotors being capable of being changed by changing the phase difference between the rotors by the relative rotation of the second rotor, the controller comprising: phase difference changing driving means that has an actuator that produces a driving force to make the second rotor relatively rotate with respect to the first rotor; demagnetization determining means for determining whether or not demagnetization of the permanent magnets of the rotors occurs during operation of the motor; and rotor phase difference controlling means for controlling the phase difference changing driving means to change the phase difference between the rotors from a current phase difference to a phase difference that results in a higher strength of the composite field in a case where the result of determination by the demagnetization determining means is positive (a first aspect of the invention).

According to the first aspect of the invention, since there is provided the phase difference changing driving means, the phase difference between the rotors can be adjusted to a desired phase difference by means of the phase difference changing driving means.

Furthermore, according to the first aspect of the invention, if the demagnetization determining means determines that demagnetization of the permanent magnets of the rotors occurs, the rotor phase difference controlling means controls the phase difference changing driving means to change the phase difference between the rotors from the current phase difference to the phase difference that results in a higher strength of the composite field. In this case, at the phase difference that results in a higher strength of the composite field, the magnetic fluxes of the permanent magnet of the first rotor and the permanent magnet of the second rotor constructively interfere with each other. As a result, demagnetization of the permanent magnets of the rotors can be prevented.

The phase difference that results in a higher strength of the composite field can be a phase difference that results in the maximum strength of the composite field. However, the phase difference that results in a higher strength of the composite field may be a phase difference that results in the minimum strength of the composite field that can avoid demagnetization.

In the first aspect of the invention, for example, the demagnetization determining means determines whether or not demagnetization of the permanent magnets of the rotors occurs at least based on state quantities representing the temperature of the permanent magnets of the rotors, the output torque of the motor, the rotational velocity of the output shaft of the motor and the phase difference between the rotors (a second aspect of the invention).

In general, as the temperature of a permanent magnet rises, demagnetization is more likely to occur. Furthermore, demagnetization is likely to occur when the phase difference between the rotors is a phase difference that results in a lower strength of the composite field. Furthermore, in general, in a low-torque high-velocity rotation range in which the rotational velocity of the output shaft is relatively high, a field current component that serves to weaken the field of the permanent magnets is added to an energizing current to the motor, so that demagnetization is likely to occur. According to the second aspect of the invention, it can be determined whether or not demagnetization of the permanent magnets occurs by taking into account various operational states of the motor.

As the state quantity representing the temperature of the permanent magnets of the rotors, for example, a detection value or an estimated value of the temperature or a substantially equivalent temperature can be used. Furthermore, as the state quantity representing the output torque of the motor (torque produced on the output shaft), for example, a command value (target value) or a detection value of the output torque can be used. Furthermore, as the state quantity representing the rotational velocity of the output shaft of the motor, for example, a detection value or an estimated value of the rotational velocity can be used. Furthermore, as the state quantity representing the phase difference between the rotors, for example, a command value (target value), a detection value or an estimated value of the phase difference can be used.

Alternatively, the demagnetization determining means may determine whether or not demagnetization of the permanent magnets of the rotors occurs at least based on a state quantity representing a field current component of an energizing current to an armature of the motor (a third aspect of the invention).

In general, the field produced by the field current component of the energizing current to the armature serves to weaken the strength of the composite field. Therefore, by being based on the state quantity representing the field current component, it can be appropriately determined whether or not demagnetization of the permanent magnets of the rotors occurs.

The state quantity representing the field current component, for example, a command value (target value) or a detection value of a current in a d-axis direction in a d-q coordinate system that represents the energizing current to the armature of the motor (a rotating coordinate system that rotates integrally with the output shaft, in which the direction of the fields of the permanent magnets is indicated by a d-axis, and the direction orthogonal to the d-axis is indicated by a q-axis) can be used.

In the second aspect of the invention, the detection value of the temperature of the permanent magnets detected by a temperature sensor can be used as the state quantity representing the temperature of the permanent magnets. However, for example, the temperature of the permanent magnets may be estimated based on a detection value of the energizing current to the armature of the motor. In the case where the temperature of the permanent magnets is estimated, it is preferred that the controller further comprises operational state determining means for determining whether or not the operational state of the motor is equivalent to the operational state in a case where it is supposed that armatures of the motor are short-circuited; and magnet temperature estimating means for estimating the temperature of the permanent magnets of the rotors from a detection value of an energizing current to the armatures while controlling an energizing circuit for the armatures to short-circuit the armatures of the motor in a case where the result of determination by the operational state determining means is positive, and the demagnetization determining means uses the value of the temperature of the permanent magnets estimated by the magnet temperature estimating means as a state quantity representing the temperature of the permanent magnets (a fourth aspect of the invention).

According to the fourth aspect of the invention, if it is determined that the operational state of the motor is equivalent to the operational state in a case where it is supposed that armatures of the motor are short-circuited, an energizing circuit for the armatures is controlled to short-circuit the armatures of the motor. Therefore, the energizing current to the armatures can be stably changed. It is to be noted that short-circuiting the armatures means that the armatures of the respective phases are short-circuited (more specifically, voltage input terminals of the armatures of the respective phases are short-circuited).

Since the magnet temperature estimating means estimate the temperature of the permanent magnets of the rotors based on the detection value of the energizing current to the armatures short-circuited, the estimation can be appropriately carried out. Furthermore, the demagnetization determining means uses the value of the temperature of the permanent magnets estimated by the magnet temperature estimating means as a state quantity representing the temperature of the permanent magnets, and therefore, it can be appropriately determined whether or not demagnetization of the permanent magnets occurs.

In the fourth aspect of the invention, in a case where an inverter circuit is used as the energizing circuit, for example, the armatures can be short-circuited by turning on all the gate elements (switching elements) on one of an upper arm and a lower arm of the inverter circuit and turning off all the gate elements (switching elements) on the other arm.

In the fourth aspect of the invention, more specifically, the magnet temperature estimating means estimates the coil resistance (winding resistance) of the armatures based on a plurality of detection values of the energizing current to the armatures of the motor. The magnet temperature estimating means estimates the induced voltage constant of the motor based on the estimated value of the coil resistance and a correlation between the current flowing through the armatures and the voltage applied to the armatures. Furthermore, the magnet temperature estimating means estimates the temperature of the permanent magnets based on the estimated induced voltage constant and a temperature characteristics of the induced voltage constant (a correlation between the induced voltage constant and the temperature of the permanent magnets).

Furthermore, according to the present invention, there is provided a method of controlling a motor via phase difference changing driving means, the motor having a first rotor, a second rotor, each of which produces a field by a permanent magnet, and an output shaft capable of rotating integrally with the first rotor of the rotors, which are coaxially disposed, the second rotor being capable of relatively rotating with respect to the first rotor, the strength of a composite field of the fields of the permanent magnets of the rotors being capable of being changed by changing the phase difference between the rotors by the relative rotation of the second rotor, and the phase difference changing driving means having an actuator that produces a driving force to make the second rotor relatively rotate with respect to the first rotor, the method comprising: a demagnetization determining step of determining whether or not demagnetization of the permanent magnets of the rotors occurs during operation of the motor; and a rotor phase difference controlling step of controlling the phase difference changing driving means to change the phase difference between the rotors from a current phase difference to a phase difference that results in a higher strength of the composite field in a case where the result of determination in the demagnetization determining step is positive (a fifth aspect of the invention).

According to the fifth aspect of the invention, as described above with regard to the controller for a motor according to the first aspect of the invention, the phase difference changing driving means is used, so that the phase difference between the rotors can be adjusted to a desired phase difference by means of the phase difference changing driving means.

Furthermore, according to the fifth aspect of the invention, if it is determined in the demagnetization determining step that demagnetization of the permanent magnets of the rotors occurs, the phase difference changing driving means is controlled to change the phase difference between the rotors from the current phase difference to the phase difference that results in a higher strength of the composite field in the rotor phase difference controlling step. In this case, at the phase difference that results in a higher strength of the composite field, the magnetic fluxes of the permanent magnet of the first rotor and the permanent magnet of the second rotor constructively interfere with each other. As a result, demagnetization of the permanent magnets of the rotors can be prevented.

BRIEF DESCRIPTION OF THE DRAWINGS

FIG. 3($b$) is a diagram showing a phase relationship between the two rotors of the motor shown in FIG. 2 in a minimum field state;

DETAILED DESCRIPTION OF THE PREFERRED EMBODIMENTS

An embodiment of the present invention will be described with reference to FIGS. 1 to 12.

Figure 1:
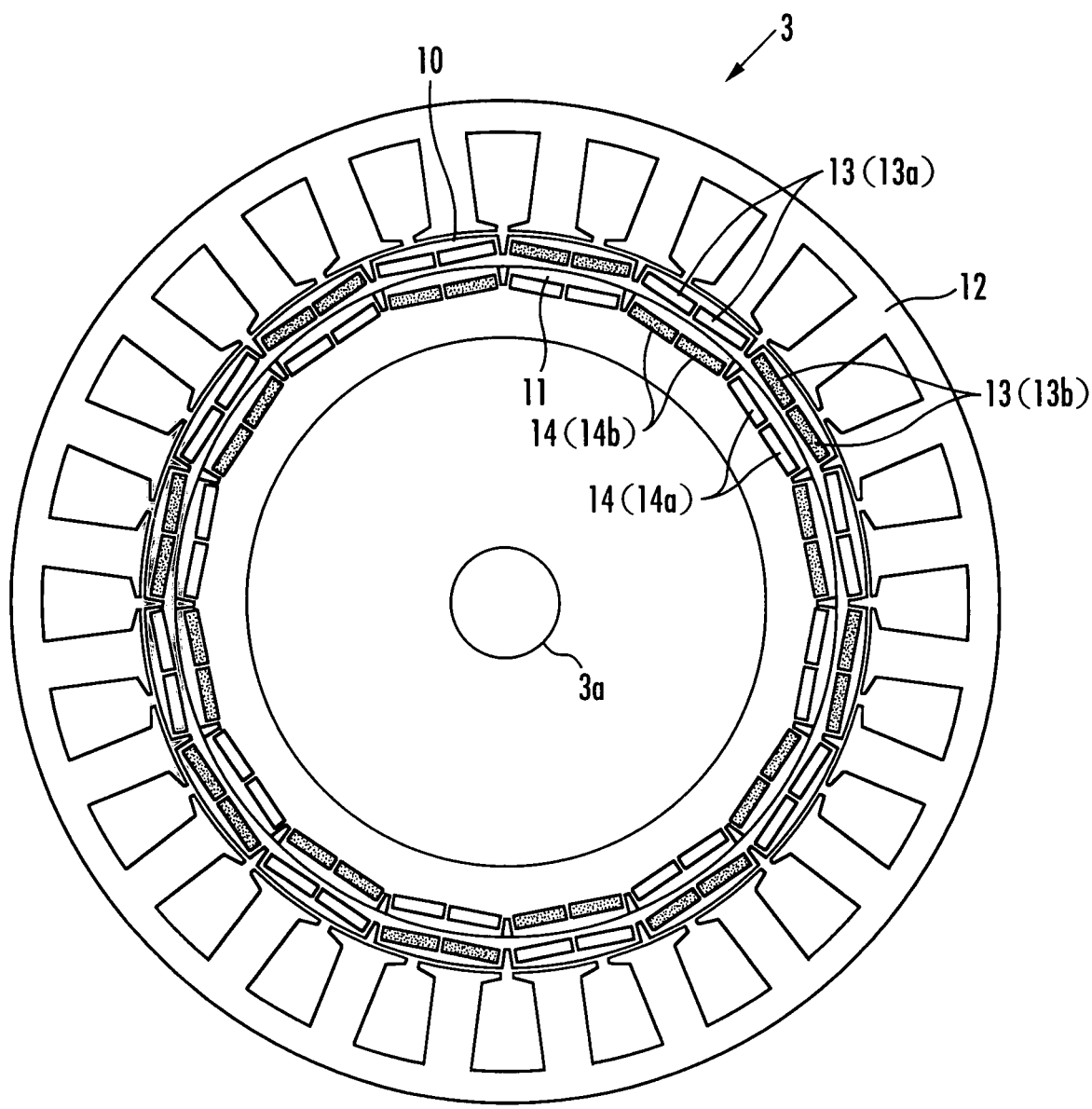
FIG. 1 is a diagram showing essential parts of the inner structure of a motor according to an embodiment of the present invention, which is seen along the axis of the motor.
Figure 2:
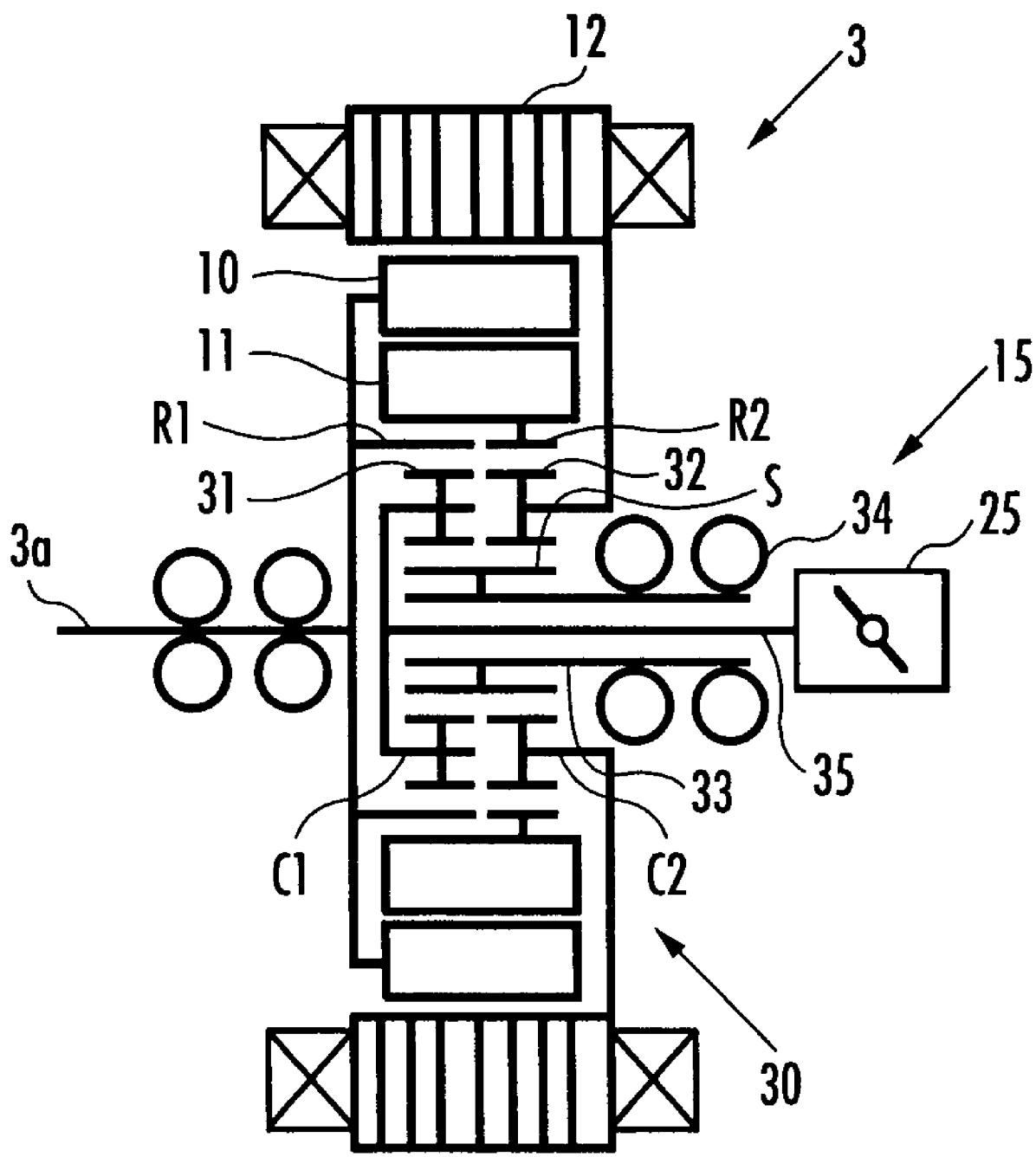
FIG. 2 is a skeleton diagram showing a driving mechanism for changing the phase difference between two rotors of the motor shown in FIG. 1.
Figure 3:
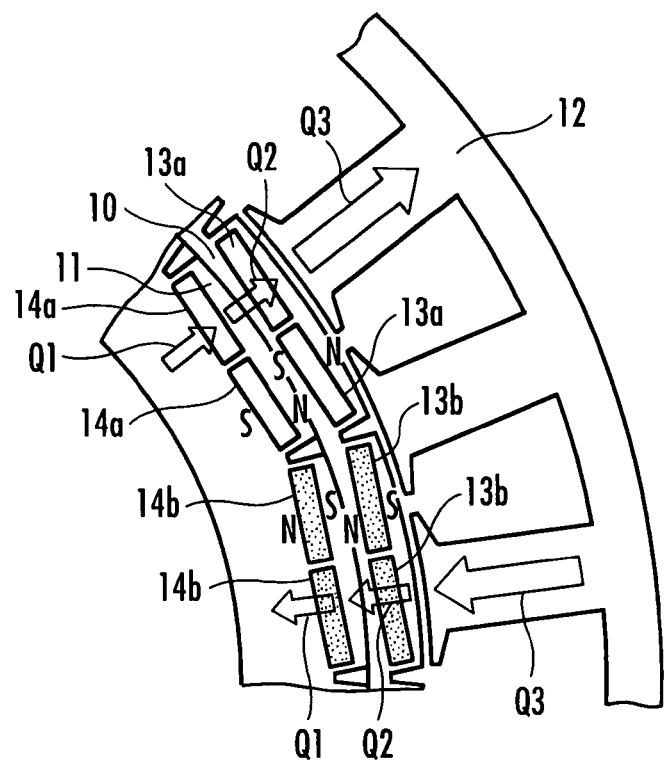
FIG. 3($a$) is a diagram showing a phase relationship between the two rotors of the motor shown in FIG. 2 in a maximum field state.
Figure 3:
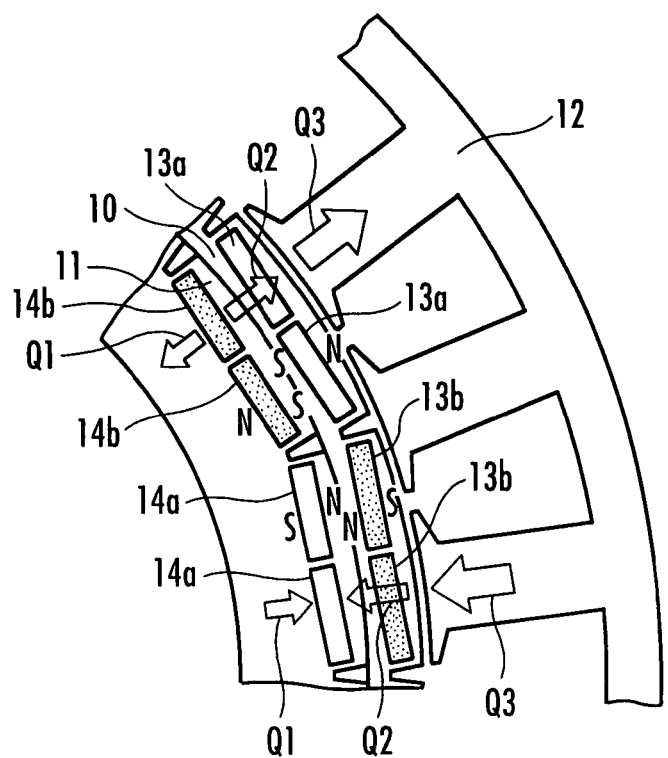

FIG. 1 is a diagram showing essential parts of the inner structure of a motor 3, which is seen along the axis of the motor 3. FIG. 2 is a skeleton diagram showing a driving mechanism for changing the phase difference between two rotors of the motor 3. In FIG. 1, illustration of the driving mechanism is omitted.

Referring to FIG. 1, the motor 3 is a DC brushless motor of a double rotor structure and has an outer rotor 10, which is a first rotor, and an inner rotor 11, which is a second rotor, which are disposed coaxially with an output shaft 3$a$. A stator 12 is disposed at the outer side of the outer rotor 10 and fixed to a housing (not shown) of the motor 3, and armatures (armatures of three phases, not shown) are attached to the stator 12.

The outer rotor 10 has an annular shape and has a plurality of permanent magnets 13 disposed at regular intervals along the circumference thereof. The permanent magnets 13 have the shape of an elongated rectangular plate and are embedded in the outer rotor 10 in such a position that the longitudinal direction thereof agrees with the axial direction of the outer rotor 10, and the normal direction thereof agrees with the radial direction of the outer rotor 10.

The inner rotor 11 also has an annular shape. The inner rotor 11 is disposed inside the outer rotor 10 coaxially with the outer rotor 10 with the outer surface thereof being in sliding contact with the inner surface of the outer rotor 10. A slight clearance may be formed between the outer surface of the inner rotor 11 and the inner surface of the outer rotor 10. Furthermore, the output shaft 3$a$, which is coaxial with the inner rotor 11 and the outer rotor 10, passes through the radial center of the inner rotor 11.

The inner rotor 11 has a plurality of permanent magnets 14 disposed at regular intervals along the circumference thereof. The permanent magnets 14 have the same shape as the permanent magnets 13 of the outer rotor 10 and are embedded in the inner rotor 11 in the same position as the permanent magnets 13 of the outer rotor 10. The number of the permanent magnets 14 of the inner rotor 11 is equal to the number of the permanent magnets 13 of the outer rotor 10.

Referring to FIG. 1, of the permanent magnets 13 of the outer rotor 10, permanent magnets 13$a$ shown without shading and permanent magnets 13$b$ shown with shading are opposite in orientation of the magnetic poles in the radial direction of the outer rotor 10. For example, the permanent magnets 13$a$ are positioned so that the N pole is located on the outer side thereof (the side of the outer surface of the outer rotor 10), and the S pole is located on the inner side thereof (the side of the inner surface of the outer rotor 10), and the permanent magnets 13$b$ are positioned so that the S pole is located on the outer side thereof, and the N pole is located on the inner side thereof. Similarly, of the permanent magnets 14 of the inner rotor 11, permanent magnets 14$a$ shown without shading and permanent magnets 14$b$ shown with shading are opposite in orientation of the magnetic poles in the radial direction of the inner rotor 11. For example, the permanent magnets 14$a$ are positioned so that the N pole is located on the outer side thereof (the side of the outer surface of the inner rotor 11), and the S pole is located on the inner side thereof (the side of the inner surface of the inner rotor 11), and the permanent magnets 14$b$ are positioned so that the S pole is located on the outer side thereof, and the N pole is located on the inner side thereof.

According to this embodiment, on the outer rotor 10, pairs of permanent magnets 13$a$, 13$a$ adjacent to each other and pairs of permanent magnets 13$b$, 13$b$ adjacent to each other are alternately disposed along the circumference of the outer rotor 10. Similarly, on the inner rotor 11, pairs of permanent magnets 14$a$, 14$a$ adjacent to each other and pairs of permanent magnets 14$b$, 14$b$ adjacent to each other are alternately disposed along the circumference of the inner rotor 11.

Referring to FIG. 2, the outer rotor 10 is connected to the output shaft 3$a$ of the motor 3 in such a manner that the outer rotor 10 can rotate integrally with the output shaft 3$a$. The inner rotor 11 is provided in such a manner that the inner rotor 11 can relatively rotate with respect to the outer rotor 10 and the output shaft 3$a$. The phase difference between the inner rotor 11 and the outer rotor 10 can be changed by the relative rotation of the inner rotor 11. According to this embodiment, as a phase difference changing means for causing a relative rotation of the inner rotor 11 with respect to the outer rotor 10 (for changing the phase difference between the rotors 10 and 11), there is provided a phase difference changer 15 having a planetary gear mechanism 30, for example.

The planetary gear mechanism 30 in the phase difference changer 15 is disposed in a hollow portion in the inner rotor 11. According to this embodiment, the planetary gear mechanism 30 is of a single-pinion type and has a first ring gear R1 fixed to the outer rotor 10 in such a manner that the first ring gear R1 can rotate integrally with the outer rotor 10 and a second ring gear R2 fixed to the inner rotor 11 in such a manner that the second ring gear R2 can rotate integrally with the inner rotor 11, which are disposed coaxially with the inner rotor 11 and the outer rotor 10. The ring gears R1 and R2 are arranged along the center axis thereof. A common sun gear S is disposed along the center axis of the ring gears R1 and R2, and a sun gear shaft 33 integral with the sun gear S is rotatably supported by a plurality of bearings 34.

A plurality of first planetary gears 31, which engage with the sun gear S and the first ring gear R1, are disposed between the sun gear S and the first ring gear R1. The first planetary gears 31 are rotatably held by a first carrier C1. In this case, the first carrier C1 is capable of rotating about the axis of the sun gear S, and each first planetary gear 31 revolves about the sun gear S as the first carrier C1 rotates.

Furthermore, a plurality of second planetary gears 32, which engage with the sun gear S and the second ring gear R2, are disposed between the sun gear S and the second ring gear R2. The second planetary gears 32 are rotatably held by a second carrier C2. In this case, the second carrier C2 is fixed to the stator 12 (or the housing) of the motor 3 and cannot rotate.

The gear ratios of the sun gear S to the first ring gear R1 and the first planetary gear 31 are equal to the gear ratios of the sun gear S to the second ring gear R2 and the second planetary gear 32.

In the planetary gear mechanism 30 configured as described above, in a state where the first carrier C1 is prevented from rotating, if the output shaft 3a of the motor 3 and the outer rotor 10 rotate, the inner rotor 11 and the second ring gear R2 integrally rotate at the same velocity and in the same direction as the output shaft 3a and the outer rotor 10. Thus, the inner rotor 11 and the outer rotor 10 rotate integrally. Then, when the first carrier C1 is driven to rotate, the inner rotor 11 relatively rotates with respect to the outer rotor 10. Thus, the phase difference between the inner rotor 11 and the outer rotor 10 (referred to as rotor phase difference, hereinafter) changes.

Thus, the phase difference changer 15 according to this embodiment changes the rotor phase difference by making an actuator 25 (rotational driving force source), such as a motor or a hydraulic actuator, drive the first carrier C1 in the planetary gear mechanism 30 to rotate. In this case, the actuator 25 is connected to the first carrier C1 via a drive shaft 35 rotatable integrally with the first carrier C1 and applies a rotational force (torque) to the first carrier C1 via the drive shaft 35.

Mechanical configurations of the motor 3 and the phase difference changer 15 for the motor 3 according to this embodiment have been described above.

While the single-pinion planetary gear mechanism 30 is used in this embodiment, a double-pinion planetary gear mechanism may be used, for example. While the output shaft 3a of the motor 3 and the outer rotor 10 are configured to integrally rotate in this embodiment, the output shaft 3a of the motor 3 and the inner rotor 11 may integrally rotate, and the outer rotor 10 may rotate relatively with respect to the output shaft 3a and the inner rotor 11. Furthermore, the configuration of the phase difference changer 15 is not limited to the configuration described above. For example, a hydraulic chamber may be formed by a vane rotor or the like inside the inner rotor 11, and the inner rotor 11 may be made to relatively rotate with respect to the outer rotor 10 by adjusting the pressure in the hydraulic chamber.

The phase difference changer 15 makes the inner rotor 11 relatively rotate with respect to the outer rotor 10, thereby changing the rotor phase difference, and as a result, the strength of a composite field (a field in the radial direction toward the stator 12) (the strength of magnetic fluxes of the composite field) of a field produced by the permanent magnets 14a and 14b of the inner rotor 11 and a field produced by the permanent magnets 13a and 13b of the outer rotor 10 changes. Hereinafter, a state where the strength of the composite field is at the maximum will be referred to as maximum field state, and a state where the strength of the composite field is at the minimum will be referred to as minimum field state. FIG. 3(a) is a diagram showing a phase relationship between the inner rotor 11 and the outer rotor 10 in the maximum field state, and FIG. 3(b) is a diagram showing a phase relationship between the inner rotor 11 and the outer rotor 10 in the minimum field state.

As shown in FIG. 3(a), the maximum field state is a state where the permanent magnets 14a and 14b of the inner rotor 11 and the permanent magnets 13a and 13b of the outer rotor 10 face each other with the opposite magnetic poles facing each other. More specifically, in this maximum field state, the permanent magnets 14a of the inner rotor 11 face the permanent magnets 13a of the outer rotor 10, and the permanent magnets 14b of the inner rotor 11 face the permanent magnets 13b of the outer rotor 10. In this state, the directions of magnetic fluxes Q1 of the permanent magnets 14a and 14b of the inner rotor 11 are the same as the directions of magnetic fluxes Q2 of the permanent magnets 13a and 13b of the outer rotor 10, respectively, and therefore, the strength of composite magnetic fluxes Q3 of the magnetic fluxes Q1 and Q2 (the strength of the composite field) is at the maximum. When the motor 3 is in a halt state, if the inner rotor 11 can freely rotate (if the actuator 25 applies no rotational force to the first carrier C1 of the planetary gear mechanism 30), the rotor phase difference is typically in an equilibrium state at the phase difference in the maximum field state.

As shown in FIG. 3(b), the minimum field state is a state where the permanent magnets 14a and 14b of the inner rotor 11 and the permanent magnets 13a and 13b of the outer rotor 10 face each other with the like magnetic poles facing each other. More specifically, in this minimum field state, the permanent magnets 14a of the inner rotor 11 face the permanent magnets 13b of the outer rotor 10, and the permanent magnets 14b of the inner rotor 11 face the permanent magnets 13a of the outer rotor 10. In this state, the radial directions of magnetic fluxes Q1 of the permanent magnets 14a and 14b of the inner rotor 11 are opposite to the radial directions of magnetic fluxes Q2 of the permanent magnets 13a and 13b of the outer rotor 10, respectively, and therefore, the strength of composite magnetic fluxes Q3 of the magnetic fluxes Q1 and Q2 (the strength of the composite field) is at the minimum.

In this embodiment, the rotor phase difference in the maximum field state is defined as 0 [deg], and the rotor phase difference in the minimum field state is defined as 180 [deg].

Figure 4:
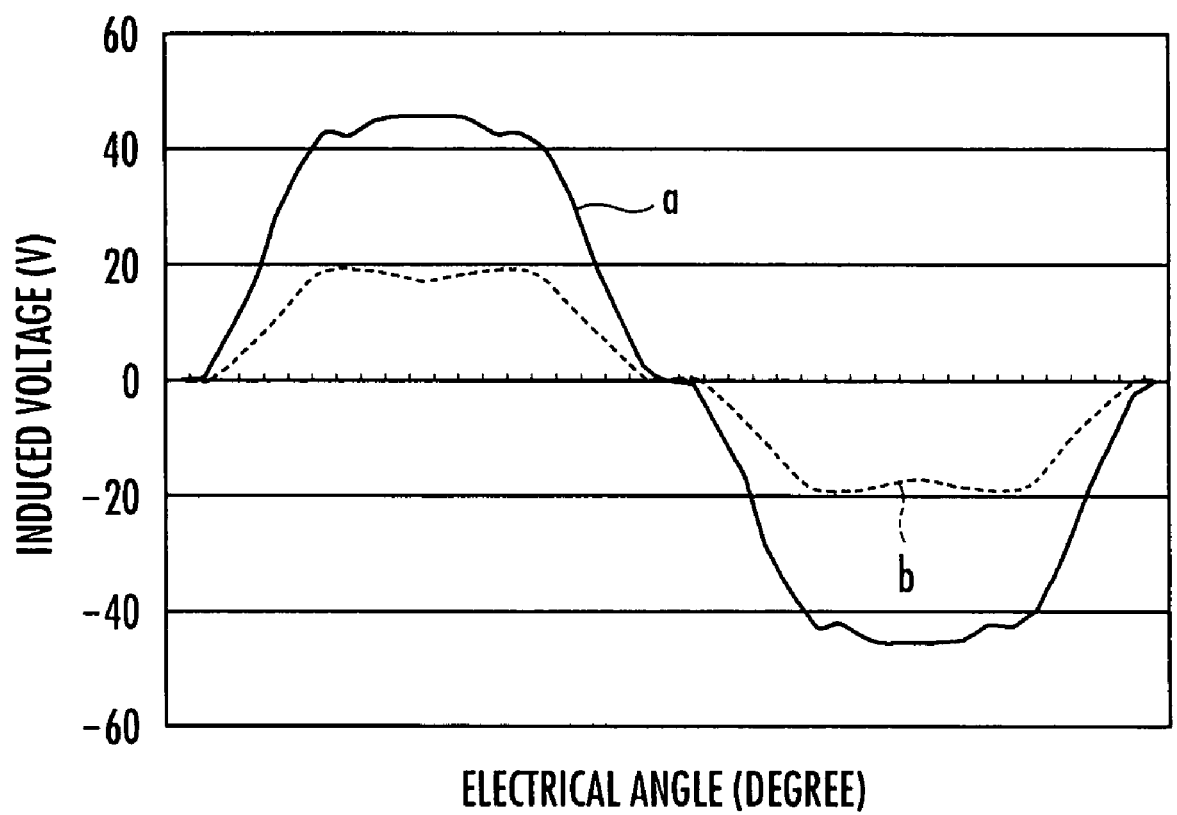
FIG. 4 shows graphs of induced voltages produced in an armature of the motor shown in FIG. 2 in the maximum field state and the minimum field state.

FIG. 4 shows, for comparison, graphs of the induced voltage produced in an armature of the stator 12 in cases where the output shaft 3a of the motor 3 rotates at a predetermined rotational velocity in the maximum field state and the minimum field state. In this drawing, the axis of ordinates indicates the induced voltage [V], and the axis of abscissas indicates the rotational angle of the output shaft 3a in terms of electrical angle [degree]. The graph denoted by reference character "a" is a graph for the maximum field state (a state where the rotor phase difference=0 [deg]), and the graph denoted by reference character "b" is a graph for the minimum field state (a state where the rotor phase difference=18 [deg]). As can be seen from FIG. 4, the level of the induced voltage (amplitude level) can be changed by changing the rotor phase difference between 0 [deg] and 180 [deg]. As the rotor phase difference increases from 0 [deg] to 180 [deg], the strength of the composite field decreases, and accordingly, the level of the induced voltage also decreases.

In this way, an induced voltage constant of the motor 3 can be changed by changing the rotor phase difference to increase or decrease the strength of the field. The induced voltage constant is a proportional constant that defines a relationship between the angular velocity of the output shaft 3a of the motor 3 and the induced voltage in the armature according to the angular velocity. The value of the induced voltage constant decreases as the rotor phase difference increases from 0 [deg] to 180 [deg].

Furthermore, of course, the rotor phase difference in the minimum field state (minimum field phase difference) may be defined as 0 [deg], and the rotor phase difference in the maximum field state (maximum field phase difference) may be defined as 180 [deg]. Generally speaking, the zero point of the rotor phase difference may be set arbitrarily.

Figure 5:
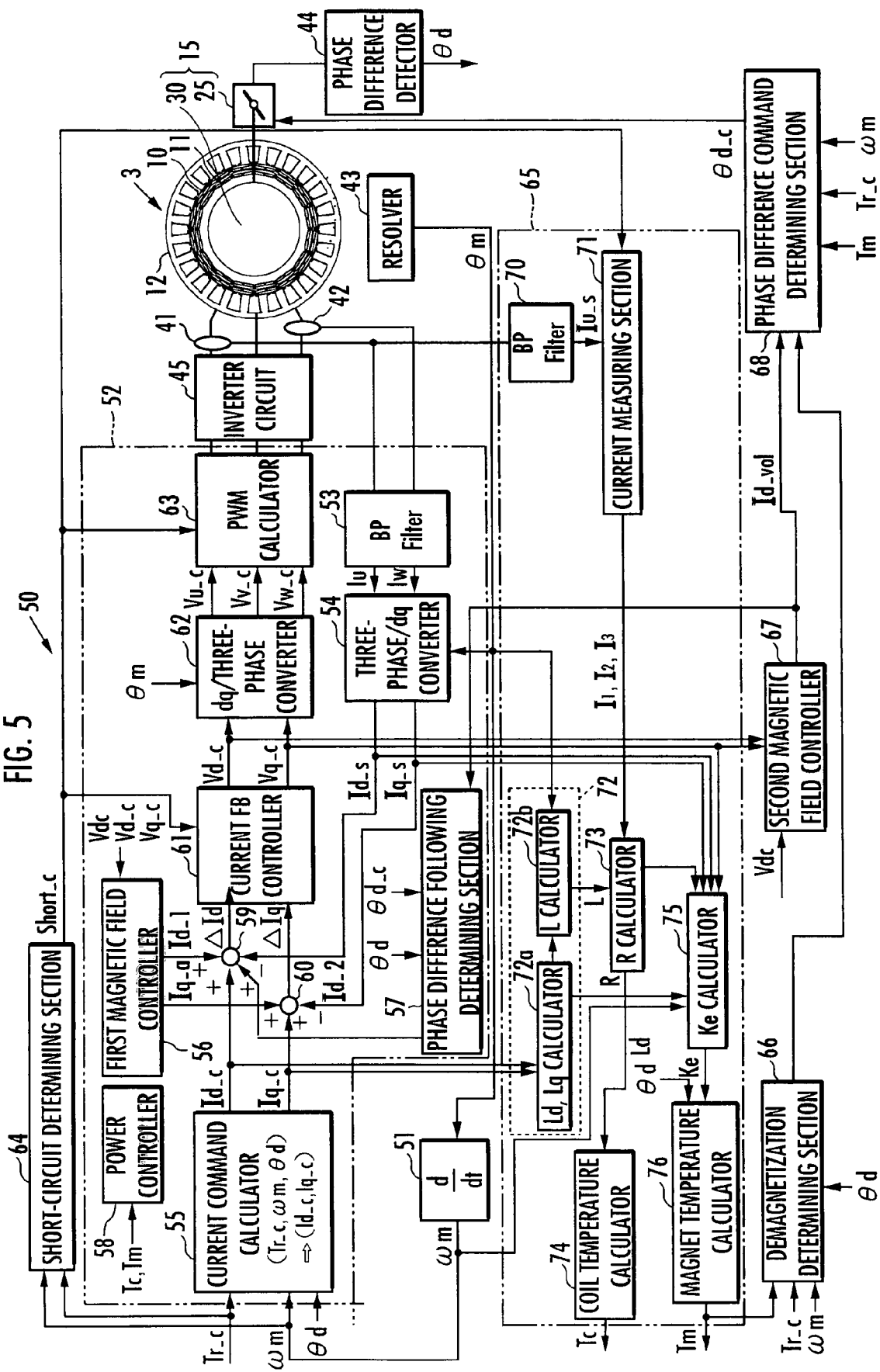
FIG. 5 is a block diagram showing a functional configuration of a controller for a motor according to the embodiment.
Figure 6:
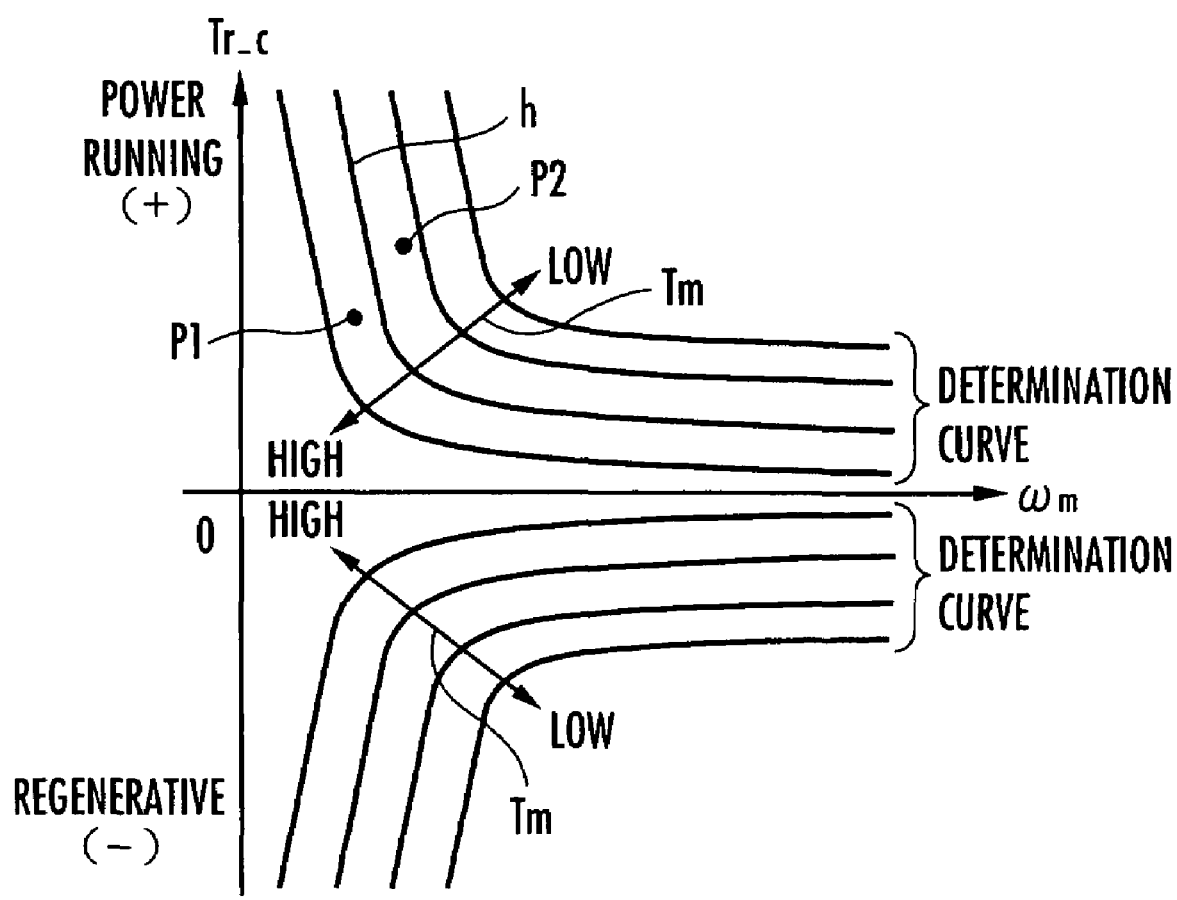
FIG. 6 is a diagram for illustrating a processing carried out by a demagnetization determining section 66 provided in the controller shown in FIG. 5.
Figure 7:
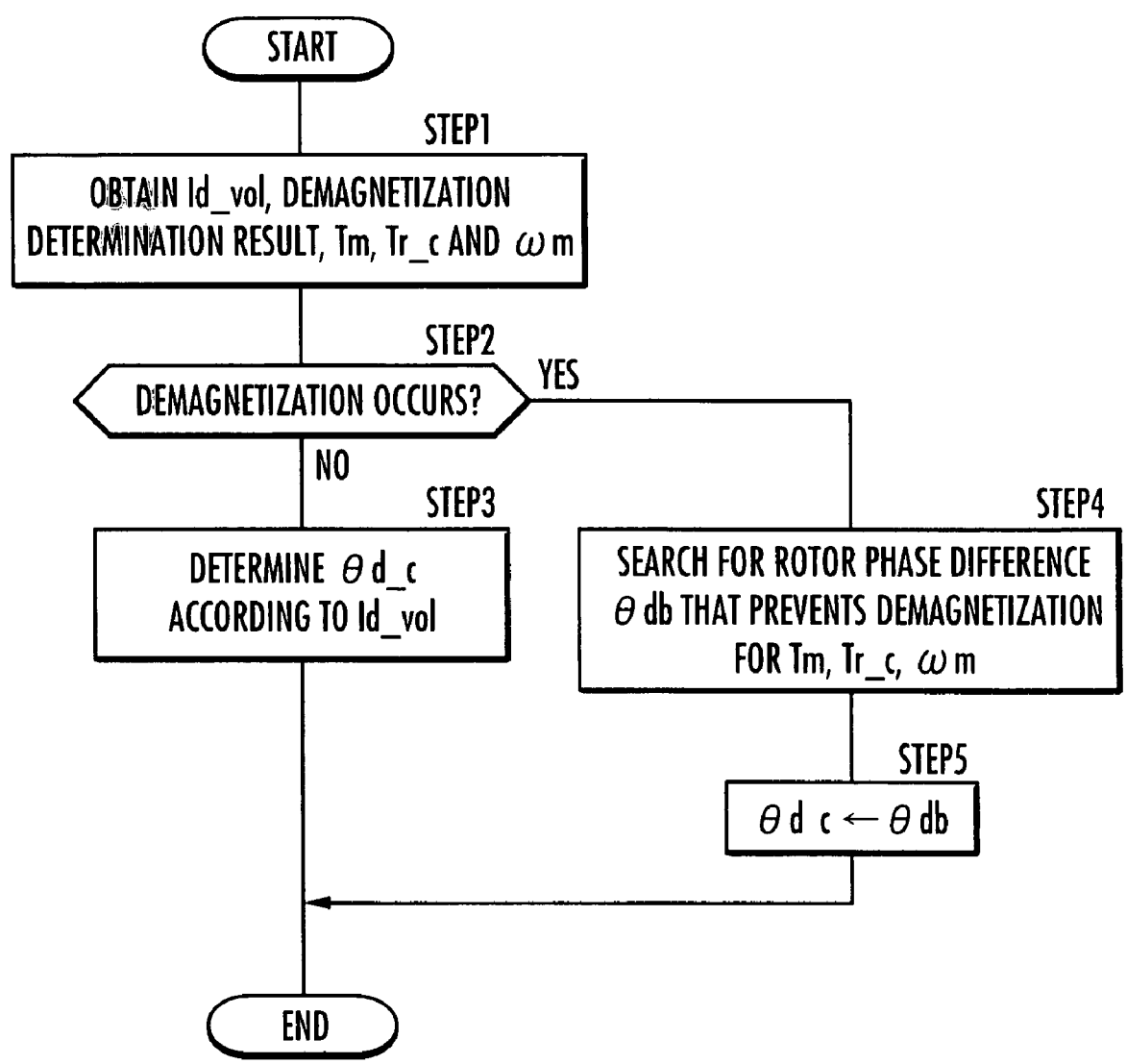
FIG. 7 is a flowchart illustrating a processing carried out by a phase difference command determining section 68 provided in the controller shown in FIG. 5.
Figure 8:
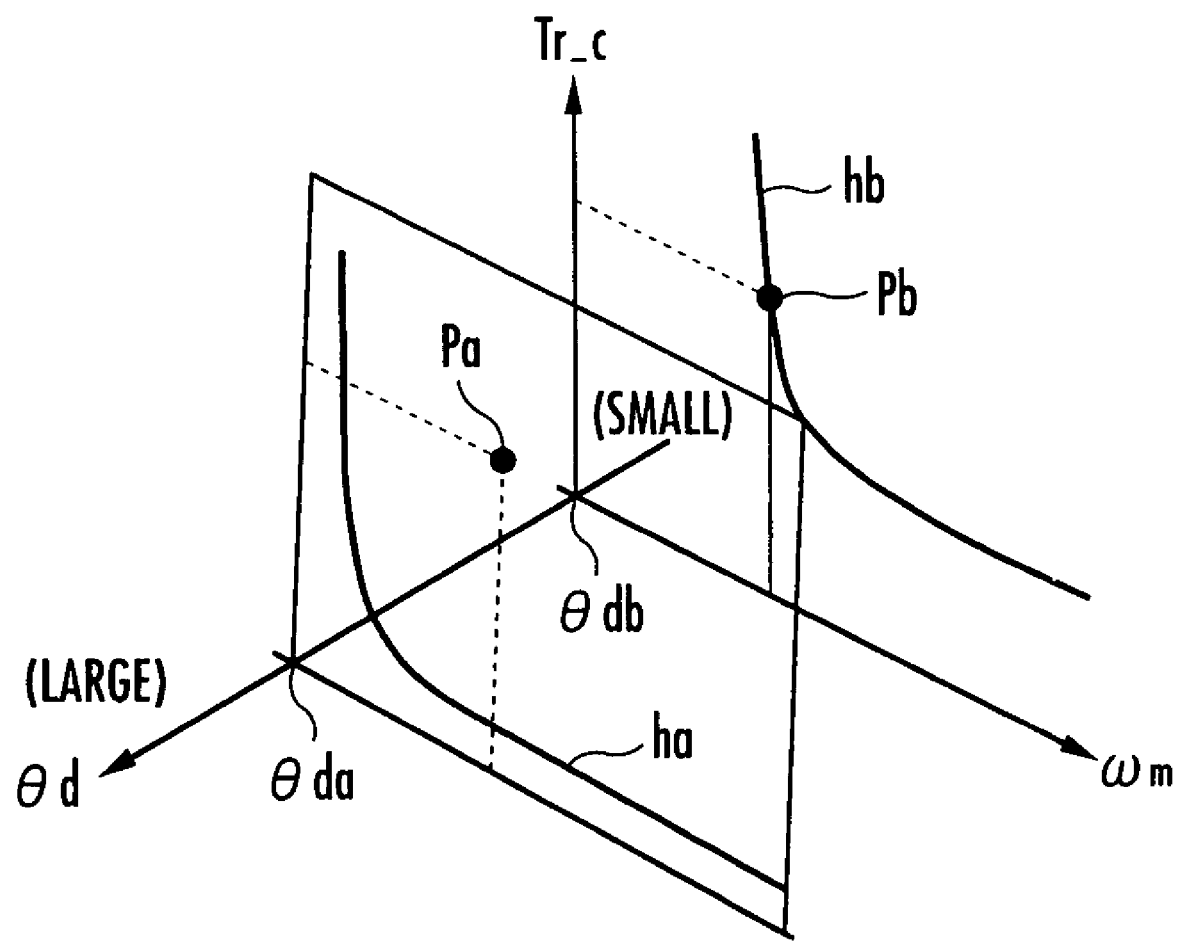
FIG. 8 is a diagram for illustrating a processing of STEP 4 shown in FIG. 7.
Figure 9:
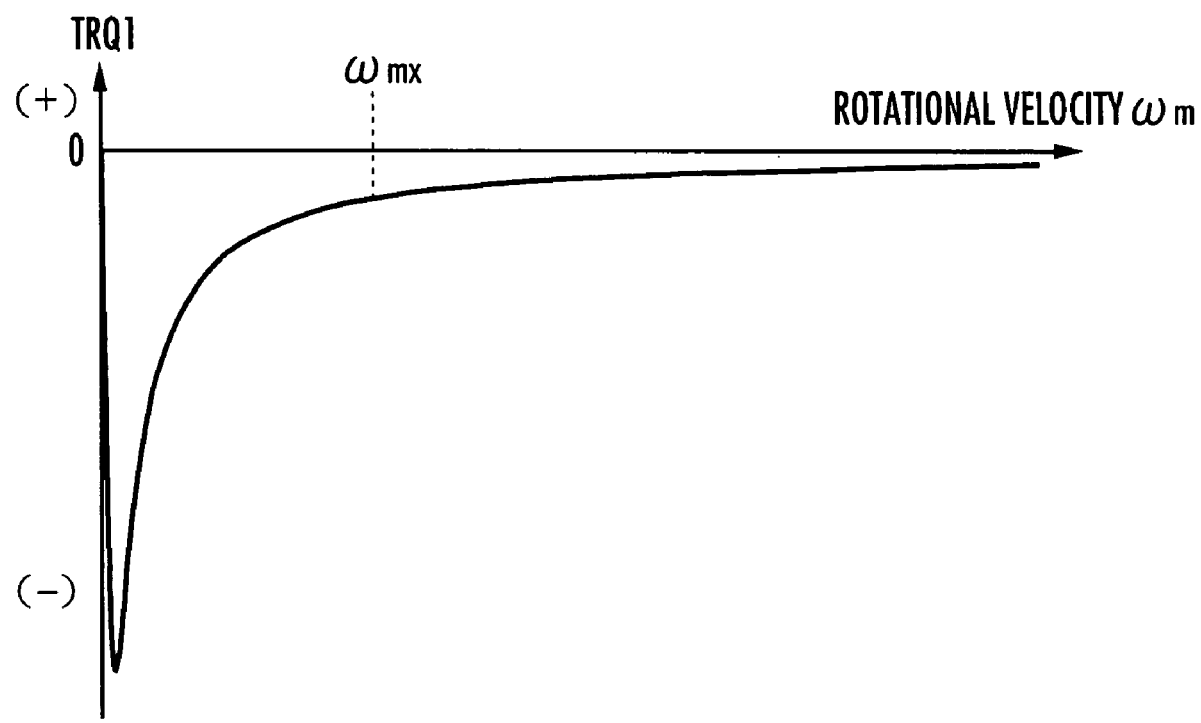
FIG. 9 is a graph for illustrating a processing carried out by a short-circuit determining section 64 provided in the controller 50 shown in FIG. 5.
Figure 10:
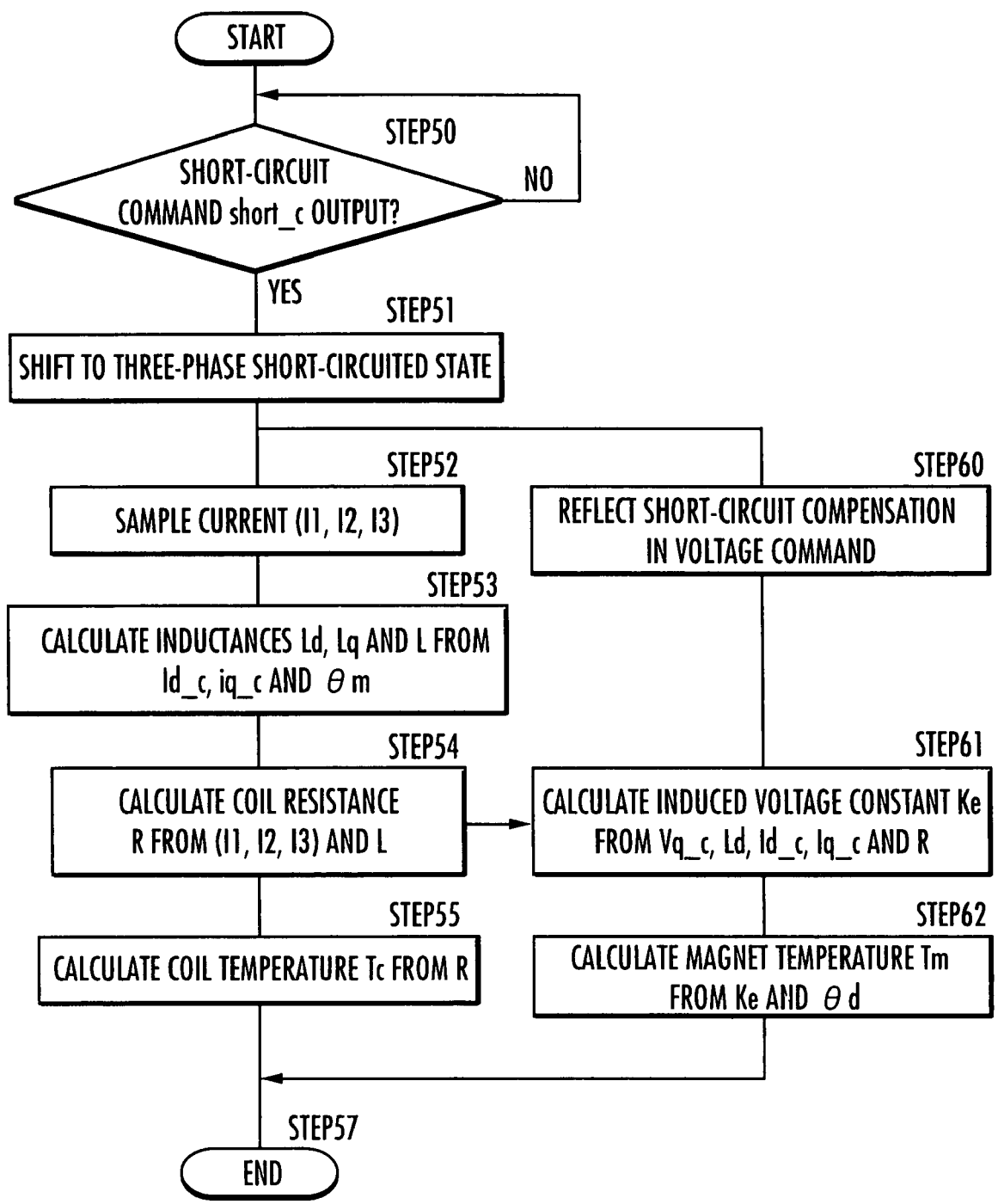
FIG. 10 is a flowchart illustrating a processing associated with a temperature estimator 65 provided in the controller 50 shown in FIG. 5.
Figure 11:
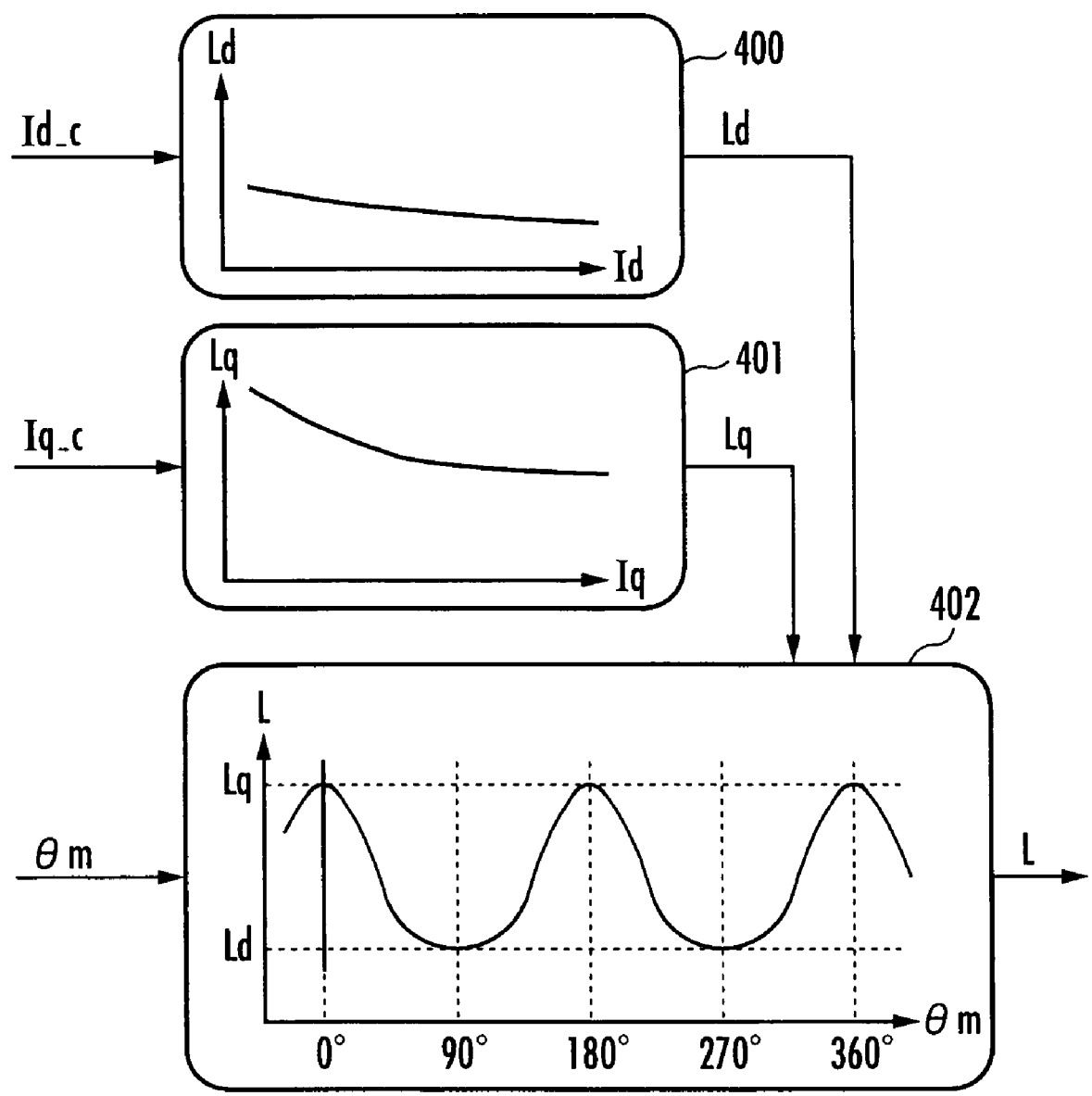
FIG. 11 is a diagram for illustrating a processing of STEP 53 shown in FIG. 10.
Figure 12:
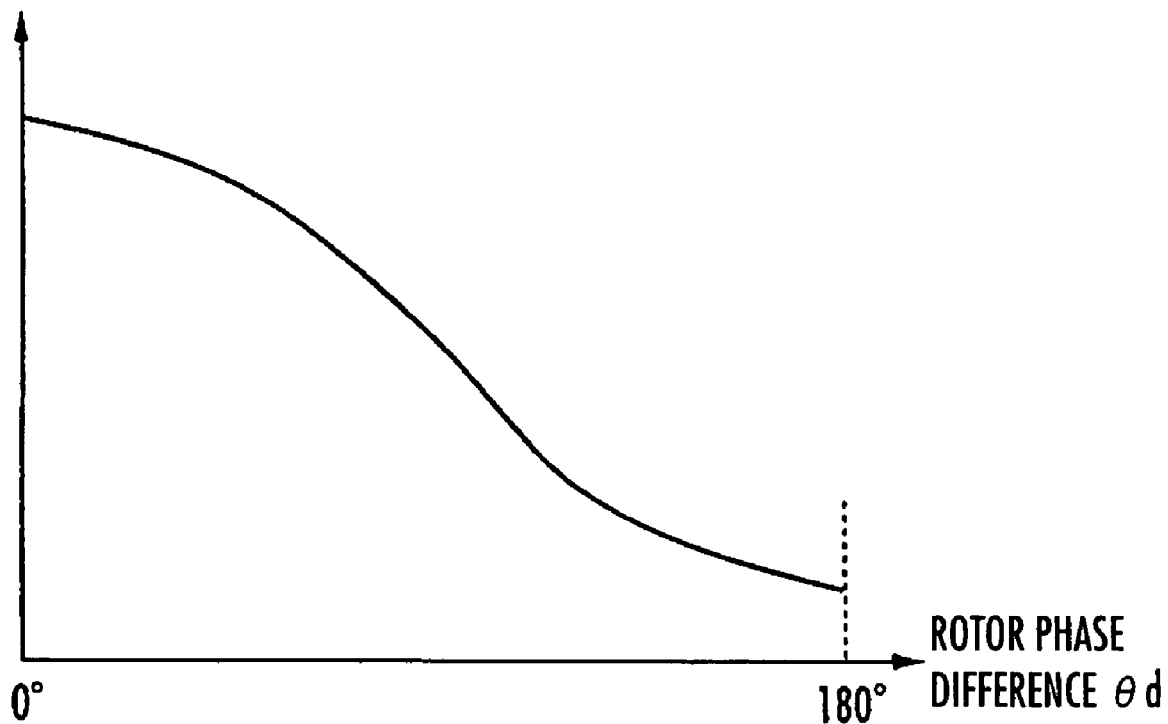
FIG. 12 is a diagram for illustrating a processing of STEP 62 shown in FIG. 10.

Now, referring to FIGS. 5 to 12, a controller 50 for the motor 3 according to this embodiment will be described. FIG. 5 is a block diagram showing a functional configuration of the controller 50 for the motor 3 (referred to simply as controller 50, hereinafter). FIG. 6 is a diagram for illustrating a processing carried out by a demagnetization determining section 66 provided in the controller 50. FIG. 7 is a flowchart illustrating a processing carried out by a phase difference command determining section 68 provided in the controller 50. FIG. 8 is a diagram for illustrating a processing of STEP 4 shown in FIG. 7. FIG. 9 is a graph for illustrating a processing carried out by a short-circuit determining section 64 provided in the controller 50. FIG. 10 is a flowchart illustrating a processing associated with a temperature estimator 65 provided in the controller 50. FIG. 11 is a diagram for illustrating a processing of STEP 53 shown in FIG. 10. FIG. 12 is a diagram for illustrating a processing of STEP 62 shown in FIG. 10. In FIG. 5, the motor 3 is shown schematically.

Referring to FIG. 5, the controller 50 according to this embodiment controls energization to the motor 3 based on a so-called d-q vector control. Specifically, for processing, the controller 50 converts the motor 3 into an equivalent circuit based on a d-q coordinate system, which is a two-phase DC rotating coordinate system, in which the direction of field is indicated by a d-axis, while the direction orthogonal to the d-axis is indicated by a q-axis. The equivalent circuit has an armature on the d-axis (referred to as d-axis armature, hereinafter) and an armature on the q-axis (referred to as q-axis armature, hereinafter). The d-q coordinate system is a coordinate system fixed with respect to the output shaft 3a of the motor 3. The controller 50 controls an energizing current to the armatures (armatures of three phases) of the motor 3 so that the output shaft 3a of the motor 3 outputs a torque according to a torque command value Tr-c externally supplied. In parallel with the energization control, the controller 50 controls the rotor phase difference by means of the phase difference changer 15.

In order to achieve these control operations, according to this embodiment, there are disposed current sensors 41 and 42 (current detecting means) for detecting currents flowing through two of the armatures of three phases of the motor 3, for example, armatures of the U-phase and the W-phase, a resolver 43 serving as rotational position detecting means for detecting a rotational position θm (rotational angle) (=rotational angle of the outer rotor 10) of the output shaft 3a of the motor 3, and a phase difference detector 44 for detecting the rotor phase difference θd. The phase difference detector 44 detects the rotor phase difference θd based on the rotational position (a target value or a detection value) of the first carrier C1 that is rotated by the actuator 25 of the phase difference changer 15, for example.

The controller 50 is an electronic unit comprising a CPU, a memory and the like and sequentially carries out the control processing at a predetermined calculation cycle. In the following, functional means of the controller 50 will be specifically described.

The controller 50 comprises a rotational velocity calculator 51 that determines the rotational velocity ωm (=rotational velocity of the outer rotor 10) of the output shaft 3a of the motor 3 by differentiation of the rotational position θm detected by the resolver 43, and an energization controller 52 that controls an energizing current to the armature of each phase of the motor 3 via an inverter circuit 45. Although details of the inverter circuit 45 are not illustrated because the inverter circuit 45 is well-known, the inverter circuit 45 comprises switching elements (FETs or the like) for three phases (i.e., three switching elements) on an upper arm and a lower arm, and free wheeling diodes connected in parallel with the respective switching elements.

The inverter circuit 45 corresponds to an energization circuit according to the present invention.

The energization controller 52 has a band-pass filter 53 that removes an unwanted component from the output signals of the current sensors 41, 42 to provide current detection values Iu and Iw for the armatures of the U phase and W phase of the motor 3 and a three-phase/dq converter 54 that calculates a detection value Id-s of the current of the d-axis armature (referred to as d-axis current, hereinafter) and a detection value Iq-s the current of the q-axis armature (referred to as q-axis current, hereinafter) by three-phase/dq conversion based on the current detection values Iu and Iw and the rotational position θm of the output shaft 3a of the motor 3 detected by the resolver 43.

Furthermore, the energization controller 52 has a current command calculator 55 that determines a d-axis current command value Id_c, which is a command value of the d-axis current, and a q-axis current command value Iq_c, which is a command value of the q-axis current, a first field controller 56 that determines a first d-axis current correction value Id_1 for correcting the d-axis current command value Id_c (for manipulating the d-axis current), a phase difference following determining section 57 that determines a second d-axis current correction value Id_2 for correcting the d-axis current command value Id_c (for manipulating the d-axis current), and a power controller 58 that determines a q-axis current correction value Iq_a for correcting the q-axis current command value Iq_c (for manipulating the q-axis current).

Furthermore, the energization controller 52 has a calculator 59 that a difference ΔId (=Id_ca−Id_s) between a corrected d-axis current command value Id_ca (=Id_c+Id_1+Id_2), which is the d-axis current command value Id_c corrected with the first d-axis current correction value Id_1 and the second d-axis current correction value Id_2, and the detection value Id_s of the d-axis current, and a calculator 60 that determines a difference ΔIq (=Iq_ca−Iq_s) between a corrected q-axis current command value Iq_ca (=Iq_c+Iq_a), which is the q-axis current command value Iq_c corrected with the q-axis current correction value Iq_a, and the detection value Iq_s of the q-axis current.

Furthermore, the energization controller 52 has a current feedback controller (current FB controller) 61 that determines a d-axis voltage command value Vd_c (a command value of the voltage on the d-axis armature) and a q-axis voltage command value Vq_c (a command value of the voltage on the q-axis armature) according to a feedback controlling rule, such as PI control, so that the differences ΔId and ΔIq approaches 0, a dq/three-phase converter 62 that converts the d-axis voltage command value Vd_c and the q-axis voltage command value Vq_c into alternating-current command values Vu_c, Vv_c and Vw_c for the respective phases (the U phase, the V phase and the W phase) according to the rotational position θm of the output shaft 3a of the motor 3 detected by the resolver 43, a PWM calculator 63 that controls the energizing current to the armature of each phase via the inverter circuit 45 by turning on and off the switching elements of the inverter circuit 45 by the PWM control according to the alternating-voltage command value Vu_c, Vv_c and Vw_c.

Preferably, the current feedback controller 61 determines the d-axis voltage command value Vd_c and the q-axis voltage command value Vq_c by adding a noninterference component for canceling an influence of speed electromotive forces that interfere with each other between the d-axis and the q-axis to the d-axis voltage command value and the q-axis voltage command value determined from the differences ΔId and ΔIq according to the feedback controlling rule, such as PI control, respectively.

To the current command calculator 55, the torque command value Tr_c externally supplied to the controller 50 (the command value of the torque to be produced on the output shaft 3a of the motor 3 (output torque of the motor 3)), the rotational velocity ωm determined by the rotational velocity calculator 51, and the rotor phase difference θd detected by the phase difference detector 44 are sequentially input. The current command calculator 55 determines the d-axis current command value Id_c and the q-axis current command value Iq_c from these input values according to a previously set map. The d-axis current command value Id_c and the q-axis current command value Iq_c serve as feedforward values (basic command values) of the d-axis current and the q-axis current for making the motor 3 produce a torque according to the torque command value Tr_c when the armatures and permanent magnets 13, 14 of the motor 3 have a certain reference temperature.

For example, in the case where the motor 3 is mounted on a hybrid or electric-powered vehicle as a propulsion force source, the torque command value Tr_c is set according to the amount of manipulation of the accelerator (the amount of depression of the accelerator pedal) or the traveling velocity of the vehicle. The torque command value Tr_c may be a command value of a power running torque or a command value of a regenerative torque. According to this embodiment, the torque command value Tr_c of the power running torque is positive, and the torque command value Tr_c of the regenerative torque is negative.

The q-axis current correction value ΔIq_a determined by the power controller 58 is intended to compensate for the effect of the changes in temperature of the permanent magnets 13, 14 and the armatures during operation of the motor 3 on the output torque of the motor 3. In general, when the temperature of the permanent magnets 13, 14 changes, the induced voltage constant Ke of the motor 3 changes, and the coil resistance R of the armature (resistance of the windings of the armature) changes, even if the rotor phase difference θd does not change. Thus, even if the q-axis current command value Iq_c is kept constant, the output torque of the motor 3 changes due to the effect of the temperature change of the permanent magnets 13, 14 and the armatures. Thus, in this embodiment, this effect is compensated for by the q-axis current correction value ΔIq_a. To determine the q-axis current correction value ΔIq_a, a temperature Tm of the permanent magnets 13, 14 (referred to as magnet temperature Tm hereinafter) calculated (estimated) by a magnet temperature calculator 76 described later, and a temperature Tc of the armature (referred to as coil temperature Tc hereinafter) calculated (estimated) by a coil temperature calculator 74 described later are input to the power controller 58. The power controller 58 determines the q-axis current correction value ΔIq_a from these input values based on a previously set map, for example.

The first field controller 56 determines the first d-axis current correction value Id_1 as a manipulation amount of the d-axis current that is intended to make the magnitude of the composite vector of the d-axis voltage command value Vd_c and the q-axis voltage command value Vq_c (phase voltage of the armature) agree with a power supply voltage Vdc (target value) externally supplied to the controller 50. The power supply voltage Vdc is set according to the detection value of the output voltage of a capacitor (not shown) serving as a power supply of the motor 3.

To determine the first d-axis current correction value Id_1, the d-axis voltage command value Vd_c and the q-axis voltage command value Vq_c determined by the current feedback controller 61 (values determined in the preceding calculation cycle), and the power supply voltage Vdc (target value) are input to the first field controller 56. The first field controller 56 determines the first d-axis current correction value Id_1 according to the feedback controlling rule so that the difference between the input power supply voltage Vdc (target value) and the magnitude of the composite vector of the d-axis voltage command value Vd_c and the q-axis voltage command value Vq_c $(=\sqrt{(Vd\_c^2+Vq\_c^2)})$.

In the processing carried out by the phase difference following determining section 57, which will be described in detail later, the second d-axis current correction value Id_2 is determined. The second d-axis current correction value Id_2 serves as a manipulation amount of the d-axis current that is intended to make the magnitude of the composite vector of the d-axis voltage command value Vd_c and the q-axis voltage command value Vq_c (phase voltage of the armature of each phase) agree with the power supply voltage Vdc (target value) in a situation that the actual rotor phase difference θd detected by the phase difference detector 44 does not agree with a phase difference command value θd_c determined by a phase difference command determining section 68 described later, such as immediately after change of the rotor phase difference is started.

Furthermore, in this embodiment, the rotor phase difference θd is basically manipulated in order to make the phase voltage of the armature agree with the power supply voltage Vdc (target value). If the actual rotor phase difference θd is shifted from the phase difference command value θd_c determined by the phase difference command determining section 68 because of a delay in control of the actual rotor phase difference θd with respect to the phase difference command value θd_c (if the actual strength of the composite field is shifted from the target strength of the composite field), the second d-axis current correction value Id_2 serves as a manipulation amount of the d-axis current (field current) for compensating for the shift. The first d-axis current correction value Id_1 serves as an additional manipulation amount of the d-axis current (field current) in the case where manipulating only the rotor phase difference θd is not enough to make the phase voltage of the armature agree with the power supply voltage Vdc (target value).

By the function of the energization controller 52 described above, the energizing current to the armature of each phase of the motor 3 is controlled so that the output torque of the motor 3 follows the torque command value Tc (or the differences ΔId and ΔIq converge to 0).

In a predetermined operational state of the motor 3, three-phase short-circuit command short_c is intermittently input to the PWM calculator 63 and the current feedback controller 61 of the energization controller 52 from the short-circuit determining section 64 described later at regular time intervals. During a period in which the three-phase short-circuit command short_c is input, the PWM calculator 63 keeps all the switching elements on one of the upper arm and lower arm of the inverter circuit 45 (three switching elements) turned on, regardless of the alternating-current voltage command values Vu_c, Vv_c and Vw_c of the armatures of the respective phases input from the dq/three-phase converter 62. In this period, the motor 3 is in a three-phase short-circuited state in which the armatures of the respective phases are short-circuited to each other (voltage input terminals of the armatures of the respective phases are short-circuited to each other). During the period in which the three-phase short-circuit command short_c is input, the current feedback controller 61 corrects the q-axis voltage command value Vq_c (Vq_c determined based on the difference ΔIq according to the feedback controlling rule) in such a manner that an excess or deficiency of the output torque of the motor 3 in the three-phase short-circuited state with respect to the torque command value Tr_c is compensated for.

In addition to the rotational velocity calculator 51 and the energization controller 52, the controller 50 comprises the short-circuit determining section 64 that determines whether or not the operational state of the motor 3 can be shifted into the three-phase short-circuited state in which the armatures of the respective phases are short-circuited to each other, the temperature estimator 65 that calculates (estimates) the magnet temperature Tm and the coil temperature Tc of the motor 3, the demagnetization determining section 66 that determines whether or not the motor 3 is in an operational state where demagnetization of the permanent magnets 13, 14 occurs based on the magnet temperature Tm and the like estimated by the temperature estimator 65, a second field controller 67 that determines a field manipulating current ΔId_vol, which serves as a manipulation amount of the field for making the magnitude of the composite vector of the d-axis voltage command value Vd_c and the q-axis voltage command value Vq_c (phase voltage of the armature of each phase) agree with the power supply voltage Vdc (target value), and the phase difference command determining section 68 that determines the phase difference command value θd_c, which is a command value of the rotor phase difference, based on the field manipulating current ΔId_vol, the result of determination by the demagnetization determining section 66, and the like.

The short-circuit determining section 64 corresponds to operational state determining means according to the present invention, the demagnetization determining section 66 corresponds to demagnetization determining means according to the present invention, and the phase difference command determining section 68 corresponds to rotor phase difference controlling means according to the present invention. The processing carried out by the demagnetization determining section 66 corresponds to a demagnetization determining step according to the present invention, and the processing carried out by the phase difference command determining section 68 corresponds to a rotor phase difference controlling step according to the present invention.

Now, a processing carried out by the temperature estimator 65 will be schematically described. The temperature estimator 65 estimates the coil resistance R of the armatures of the motor 3 based on a detection value Iu_s of the energizing current to the armature of any phase, for example, the armature of the U phase, in the three-phase short-circuited state. Then, the temperature estimator 65 estimates the coil temperature Tc, as the temperature of the armatures, and the induced voltage constant Ke of the motor 3 from the estimated value of the coil resistance R. Furthermore, the temperature estimator 65 estimates the magnet temperature Tm from the estimated value of the induced voltage constant Ke. In order to use the detection value Iu_s of the energizing current to the armature of the U phase in the three-phase short-circuited state, there is provided the short-circuit determining section 64. Details of the processings carried out by the short-circuit determining section 64 and the temperature estimator 65 will be described later.

In this embodiment, as parameters indicating the temperature of the permanent magnets 13, 14, the output torque of the motor 3, the rotational velocity of the output shaft 3a of the motor 3, and the rotor phase difference, the magnet temperature Tm calculated by the magnet temperature calculator 76 of the temperature estimator 65 described in detail later, the torque command value Tr_c, the rotational velocity ωm calculated by the rotational velocity calculator 51, and the rotor phase difference θd detected by the phase difference detector 44 are sequentially input to the demagnetization determining section 66, respectively. Then, the demagnetization determining section 66 determines whether or not the motor 3 is in a state where demagnetization of the permanent magnets 13, 14 occurs based on these input values.

This determination is carried out based on a map previously set as shown in FIG. 6. The map shown in FIG. 6 is configured for one value of the rotor phase difference θd, the axis of ordinates indicates the torque command value Tr_c, and the axis of abscissas indicates the rotational velocity ωm. This map shows a plurality of determination curves (hyperbolas) for determining whether or not the motor 3 is in a state where demagnetization of the permanent magnets 13, 14 occurs, which are associated with a plurality of magnet temperatures Tm, in each of the region where the torque command value Tr_c is positive (power running torque) and the region where the torque command value Tr_c is negative (regenerative torque). In the region where the torque command value Tr_c is positive, the area on the left or lower side of the determination curve for each magnet temperature Tm (the area defined by the determination curve, the axis of ordinates and the axis of abscissas and including the determination curve) represents the area in which it is determined that demagnetization of the permanent magnets 13, 14 does not occur, and the area on the right or upper side of the determination curve represents the area in which it is determined that demagnetization occurs. Similarly, in the region where the torque command value Tr_c is negative, the area on the right or lower side of the determination curve for each magnet temperature Tm represents the area in which it is determined that demagnetization of the permanent magnets 13, 14 occurs, and the area on the left or upper side of the determination curve (the area defined by the determination curve, the axis of ordinates and the axis of abscissas and including the determination curve) represents the area in which it is determined that demagnetization does not occur. The determination curves approach the axis of ordinates and the axis of abscissas as the value of the magnet temperature Tm increases. Therefore, as the magnet temperature Tm increases, the area in which demagnetization does not occur (the range of the set of torque command value Tr_c and rotational velocity ωm) becomes narrower.

In this embodiment, such a map as shown in FIG. 6 is provided for each of a plurality of values of the rotor phase difference θd. In this case, the determination curves for each rotor phase difference θd are determined so that, supposing that the magnet temperature Tm is constant, the area in which it is determined that demagnetization does not occur becomes wider (the determination curve becomes farther from the axis of ordinates and the axis of abscissas) as the rotor phase difference θd decreases (the strength of the composite field becomes higher).

The demagnetization determining section 66 selects a determination curve in the map shown in FIG. 6 based on the input magnet temperature Tm and rotor phase difference θd, and determines whether demagnetization occurs or not according to which side of the selected determination curve the set of the input torque command value Tr_c and rotational velocity ωm lies on. For example, in the case where a determination curve h in FIG. 6 is associated with the input magnet temperature Tm and rotor phase difference θd, if the set of the input torque command value Tr_c and rotational velocity ωm is represented by a point P1 in FIG. 6, it is determined that demagnetization does not occur. If, with respect to the determination curve h, the set of the input torque command value Tr_c and rotational velocity ωm is represented by a point P2 in FIG. 6, it is determined that demagnetization occurs.

In this embodiment, the torque command value Tr_c is used as a state quantity representing the output torque of the motor 3. However, for example, the detection value of the output torque, the q-axis current command value Iq_c or the detection value Iq_s of the q-axis current may be used. Furthermore, a detection value of the rotational velocity obtained by an appropriate velocity sensor may be used as a state quantity representing the rotational velocity of the output shaft 3a. Furthermore, if there is provided a temperature sensor that detects the temperature of the permanent magnets 13, 14 or a temperature equivalent thereto, the detected temperature value may be used as a state quantity representing the temperature of the permanent magnets 13, 14. Furthermore, a value of the rotor phase difference estimated by an appropriate method using a model or the like may be used as a state quantity representing the rotor phase difference.

As with the first field controller 56, in order to determine the field manipulating current Id_vol, the power supply voltage Vdc (target value) of the motor 3, and the d-axis voltage command value Vd_c and the q-axis voltage command value Vq_c determined by the energization controller 52 are sequentially input to the second field controller 67. The second field controller 67 determines the field manipulating current Id_vol according to a feedback controlling rule so that the difference between the magnitude of the composite vector of the input values Vd_c and Vq_c ($=\sqrt{(Vd\_c^2+Vq\_c^2)}$) and the power supply voltage Vdc approaches 0.

Furthermore, to make the magnitude of the composite vector of Vd_c and Vq_c agree with the power supply voltage Vdc (to make the composite vector follow the circumference of a circle having a radius of Vdc), there are two approaches. One is to adjust the d-axis current to indirectly manipulate the field between the rotors 10, 11 and the armatures. The other is to adjust the rotor phase difference θd (and therefore the induced voltage constant Ke) to directly manipulate the composite field of the permanent magnets 13, 14. The field manipulating current Id_vol is a manipulation amount of the field represented in terms of a manipulation amount of the d-axis current.

The second field controller 67 may determine the rotor phase difference θd or the induced voltage constant Ke as a manipulation amount, instead of the field manipulating current Id_vol.

To the phase difference command determining section 68, the field manipulating current Id_vol determined by the second field controller 67 as described above, as well as the result of determination by the demagnetization determining section 66 (sometimes referred to as demagnetization determination result, hereinafter), the magnet temperature Tm calculated by the magnet temperature calculator 76 of the temperature estimator 65 described in detail later, the torque command value Tr_c, and the rotational velocity ωm calculated by the rotational velocity calculator 51 are sequentially input.

The phase difference command determining section 68 determines the phase difference command value θd_c based on these input values by the process shown in the flowchart of FIG. 7.

Referring to FIG. 7, first, the phase difference command determining section 68 obtains the field manipulating current Id_vol, the demagnetization determination result, the magnet temperature Tm, the torque command value Tr_c and the rotational velocity ωm input thereto as described above (STEP 1).

Then, the phase difference command determining section 68 determines whether or not demagnetization occurs based on the demagnetization determination result (STEP 2). The determination carried out by the demagnetization determining section 66 may be carried out by the phase difference command determining section 68.

If the result of determination in STEP 2 is negative (demagnetization does not occur), the phase difference command determining section 68 determines the phase difference command value θd_c according to the input field manipulating current Id_vol (STEP 3). Specifically, the field manipulating current Id_vol is converted into a manipulation amount (correction amount) of the rotor phase difference θd that provides a change of the field equivalent to that in the case where the d-axis current is manipulated with the field manipulating current Id_vol, and the current phase difference command value θd_c (which is determined in the preceding calculation cycle) is corrected with the manipulation amount of the rotor phase difference θd, thereby determining a new phase difference command value θd_c1 (a current value). In this case, the conversion of the field manipulating current Id_vol into the manipulation amount of the rotor phase difference θd is carried out by multiplying the field manipulating current Id_vol by a gain that is determined according to the current phase difference command value θd_c, for example.

On the other hand, if the result of determination in STEP 2 is positive (demagnetization occurs), the phase difference command determining section 68 searches for a rotor phase difference θdb for which it can be determined that demagnetization does not occur with respect to the input torque command value Tr_c, rotational velocity ωm and magnet temperature Tm based on the map (FIG. 6) used by the demagnetization determining section 66 (STEP 4). Then, the phase difference command determining section 68 designates the rotor phase difference θdb as the phase difference command value θd_c (STEP 5).

The processing of STEP 4 will be specifically explained with reference to FIG. 8. In this drawing, it is supposed that the current rotor phase difference θd is θda, and the determination curve corresponding to the current magnet temperature Tm is denoted by reference character "ha". In addition, the set of the current torque command value Tr_c and rotational velocity ωm is represented by a point Pa in FIG. 8. In this case, the demagnetization determining section 66 determines that demagnetization occurs, the result of determination in STEP 2 is positive.

In this case, in STEP 4, for example, a value θdb of the rotor phase difference θd is searched for which the set of the current torque command value Tr_c and rotational velocity ωm is represented by a point Pb on a determination curve hb corresponding to the current magnet temperature Tm. This rotor phase difference θdb is such a rotor phase difference that the demagnetization determining section 66 determines that demagnetization does not occur when the actual rotor phase difference θd is adjusted to the rotor phase difference θdb while maintaining the current values of the torque command value, Tr_c, the rotational velocity ωm and the magnet temperature Tm.

Furthermore, if the magnet temperature Tm is constant, the area in which it is determined that demagnetization does not occur (the range of the set of the torque command value Tr_c and the rotational velocity ωm) becomes wider as the rotor phase difference θd decreases (as the strength of the composite field increases). Therefore, the rotor phase difference θdb searched for in STEP 4 as described above is the minimum rotor phase difference with which demagnetization can be prevented. The rotor phase difference θdb provides a composite field stronger than the composite field for the current actual rotor phase difference θdb.

In STEP 5, to allow for a margin, a rotor phase difference slightly smaller than the rotor phase difference θdb searched for in STEP 4 as described above (for example, θdb minus a predetermined value (>0)) may be designated as the phase difference command value θd_c.

Details of the processing carried out by the phase difference command determining section 68 have been described above. The phase difference command value θd_c determined by the phase difference command determining section 68 in this way is output to the phase difference changer 15. Then, the phase difference changer 15 controls the rotor phase difference θd according to the input phase difference command value θd_c by means of the actuator 25. Specifically, the rotor phase difference is controlled so that the rotor phase difference θd detected by the phase difference detector 44 agrees with the phase difference command value θd_c.

By determining the phase difference command value θd_c as described above, in a situation where demagnetization does not occur, the rotor phase difference θd is controlled according to the field manipulating current Id_vol. Therefore, the rotor phase difference θd is controlled between the phase difference with which the field is maximized (=0 [deg]) and the phase difference with which the field is minimized (=180 [deg]) in such a manner that the magnitude of the composite vector of the d-axis voltage command value Vd_c and the q-axis voltage command value Vq_c (the phase voltage of the armatures) agrees with the power supply voltage Vdc (target value). On the other hand, in a situation where demagnetization occurs, by determining the phase difference command value θd_c as described above, the rotor phase difference θd is controlled to be a rotor phase difference smaller than the current rotor phase difference θd via the phase difference changer 15. In other words, the rotor phase difference θd is controlled to be a rotor phase difference that provides a composite field stronger than the composite field for the current rotor phase difference θd (a rotor phase difference that increases the degree of constructive interference between the magnetic fluxes of the permanent magnets 13 of the outer rotor 10 and the permanent magnets 14 of the inner rotor 11). As a result, occurrence of demagnetization of the permanent magnets 13, 14 can be prevented.

Now, the processing carried out by the phase difference following determining section 57 of the energization controller 52 will be described. In this embodiment, as described above, in order that the magnitude of the composite vector of the d-axis voltage command value Vd_c and the q-axis voltage command value Vq_c agrees with the power supply voltage Vdc (target value), basically, the rotor phase difference θd is adjusted to manipulate the composite field of the permanent magnets 13, 14. In this case, in general, there is a delay for the actual rotor phase difference θd to follow the phase difference command value θd_c. As a result, there occurs a situation where the rotor phase difference θd_e estimated by the phase difference estimator 74 does not agree with the phase difference command value θd_c. In such a situation, in order to compensate for the excess or deficiency of the actual composite field, the phase difference following determining section 57 determines the second d-axis current correction value Id_2 as a manipulation amount of the d-axis current.

To carry out this processing, the rotor phase difference θd detected by the phase difference detector 44, the phase difference command value θd_c determined by the phase difference command determining section 68 and the field manipulating current Id_vol determined by the second field controller 67 are sequentially input to the phase difference following determining section 57.

Then, if the input rotor phase difference θd (detection value) agrees with the phase difference command value θd_c, the phase difference following determining section 57 sets the second d-axis current correction value ΔId_2 at 0. If the input rotor phase difference θd does not agree with the phase difference command value θd_c, the phase difference following determining section 57 designates the field manipulating current Id_vol as the second d-axis current correction value ΔId_2. The second d-axis current correction value ΔId_2 thus determined is input to the calculator 59.

Now, processings carried out by the short-circuit determining section 64 and the temperature estimator 65 will be described in more detail.

First, the short-circuit determining section 64 will be described. To the short-circuit determining section 64, the torque command value Tr_c and the rotational velocity ωm of the output shaft 3a of the motor 3 calculated by the rotational velocity calculator 51 are input. The short-circuit determining section 64 determines whether or not the operational state of the motor 3 can be shifted into the three-phase short-circuited state based on these input values. In this case, the short-circuit determining section 64 determines that the operational state of the motor 3 can be shifted into the three-phase short-circuited state if the output torque of the motor 3 in the case where the PWM calculator 63 controls the inverter circuit 45 to be in the three-phase short-circuited state is substantially equal to the output torque in the case where the PWM calculator 63 controls the inverter circuit 45 according to the alternating-current voltage command values Vu_c, Vv_c and Vw_c for the respective phases determined by the dq/three-phase converter 62. In other words, the short-circuit determining section 64 determines that the operational state of the motor 3 can be shifted into the three-phase short-circuited state if the motor 3 can produce a torque substantially equivalent to the torque command value Tr_c even when the operational state is shifted into the three-phase short-circuited state. If the short-circuit determining section 64 determines that the operational state can be shifted into the three-phase short-circuited state, the short-circuit determining section 64 intermittently outputs the short-circuit command short_c to the current feedback controller 61 and the PWM calculator 63 at regular time intervals. The short-circuit command short_c is output also to a current measuring section 71 of the temperature estimator 65, which will be described later (see FIG. 5).

In general, a short-circuit torque value TRQ1, which is the output torque of the motor 3 in the three-phase short-circuited state, is expressed by the following Formula (1).

[Formula 1]

$$TRQ1 = 3 \cdot \left( \frac{-R \cdot \omega e \cdot Ke}{R^2 + \omega e^2 \cdot Ld \cdot Lq} \right) \left\{ Ke + (Ld - Lq) \cdot \left( \frac{-Lq \cdot \omega e^2 \cdot Ke}{R^2 + \omega e^2 \cdot Ld \cdot Lq} \right) \right\} \quad (1)$$

"ωe" on the right-hand side of the Formula (1) represents the electrical angular velocity of the output shaft 3*a* of the motor 3, which is proportional to the rotational velocity ωm calculated by the rotational velocity calculator 51 (the product of the rotational velocity ωm and the number of pairs of poles of the rotors 10, 11). "Ld" and "Lq" represents the inductances of the d-axis armature and the q-axis armature, respectively. "R" and "Ke" represents the coil resistance and the induced voltage constant, respectively, as described above.

FIG. 9 is a graph showing a relationship between the short-circuit torque value TRQ1 given by the Formula (1) and the rotational velocity ωm. As shown in this drawing, the short-circuit torque value TRQ1 is a negative torque (regenerative torque), and the value is substantially constant if the rotational velocity ωm is equal to or higher than a predetermined value ωmx (strictly speaking, the value is proportional to the inverse of ωm or ωe).

Thus, in this embodiment, the short-circuit determining section 64 determines that the operational state of the motor 3 can be shifted into the three-phase short-circuited state if the following conditions (1), (2) and (3) are satisfied.

(1) The amount of change in torque command value Tr_c in a certain length of time is small (the absolute value of the mount of change is equal to or smaller than a predetermined value).

(2) The rotational velocity ωm is a rotational velocity that makes the short-circuit torque value TRQ1 substantially constant (the rotational velocity ωm is equal to or higher than the predetermined value ωmx).

(3) The absolute value of the difference between the torque command value Tr_c and the short-circuit torque value TRQ1 determined by the Formula (1) is equal to or less than a predetermined value (TRQ1≈Tr_c).

In this case, as the values Ld, Lq, R and Ke, which are required to determine the short-circuit torque value TRQ1 concerning the condition (3) by the Formula (1), previously determined fixed values are used. If the rotational velocity ωm lies in a high velocity range equal to or higher than the predetermined value ωmx, the change in short-circuit torque value TRQ1 is sufficiently small with respect to the changes in Ld, Lq, R and Ke. Therefore, even if the values Ld, Lq, R and Ke are fixed, the short-circuit torque value TRQ1 can be determined with sufficient precision. As the values R and Ke, the latest values calculated by an R calculator 73 and a Ke calculator 75 (see FIG. 5), which will be described later, may be used, respectively.

Furthermore, for the rotational velocity ωm equal to or higher than the predetermine value ωmx, the relationship between the short-circuit torque value TRQ1 and the rotational velocity ωm may be previously determined as a data table, and the short-circuit torque value TRQ1 may be determined from the rotational velocity ωm (which is calculated by the rotational velocity calculator 51) based on the data table.

Now, the temperature estimator 65 will be described. As shown in FIG. 5, the temperature estimator 65 has a band-pass filter 70 that removes an unwanted component from the output signals of the current sensor 41 to provide a current detection value Iu_s for the armature of the U phase of the motor 3, the current measuring section 71 that samples the current detection value Iu_s in the three-phase short-circuited state, an inductance calculator 72 that calculates (estimates) the inductance L of the armature, the R calculator 73 that calculates (estimates) the coil resistance R, the coil temperature calculator 74 that calculates (estimates) the coil temperature Tc, the Ke calculator 75 that calculates (estimates) the induced voltage constant Ke, and the magnet temperature calculator 76 that calculates (estimates) the magnet temperature Tm.

In the following, processings carried out by these sections will be described specifically with reference to FIGS. 5 and 10 to 12. FIG. 10 is a flowchart concerning estimation of the coil temperature Tc and the magnet temperature Tm. This flowchart includes not only the processing carried out by the temperature estimator 65 but also the processings carried out by the current feedback controller 61 and the PWM calculator 63 in the three-phase short-circuited state.

Referring to FIG. 10, when it is determined in STEP 50 that the short-circuit command short_c is output from the short-circuit determining section 64, the current feedback controller 61, the PWM calculator 63 and the temperature estimator 65 carry out the process from STEP 51.

First, the PWM calculator 63 carries out the processing of STEP 51. This processing is to make the armatures of the motor 3 shift into the three-phase short-circuited state. In this processing, the PWM calculator 63 turns on all the switching elements (three switching elements) on one of the upper arm and the lower arm of the inverter circuit 45 and turns off all the switching elements (three switching elements) on the other arm. As a result, the armatures of the motor 3 shift into the three-phase short-circuited state.

Then, the current measuring section 71 of the temperature estimator 65 carries out the processing of STEP 52. This processing is to sample a plurality of current detection values used for calculating the coil resistance R. Specifically, the current measuring section 71 carries out three-point sampling of the current detection value Iu_s for the U-phase armature input from the band pass filter 70 at regular time intervals Δt. In the following, the sampling values of the current detection value Iu_s will be represented by $I_1$, $I_2$ and $I_3$ in the chronological order. While the sampling values $I_1$, $I_2$ and $I_3$ of the current detection value Iu_s for the U-phase armature are used in this embodiment, sampling values of the current detection value for the armature of another phase may be used.

Then, the inductance calculator 72 of the temperature estimator 65 carries out the processing of STEP 53. As shown in FIG. 5, the d-axis current command value Id_c and the q-axis current command value Iq_c determined by the current command calculator 55, and the rotational position θm of the output shaft 3*a* of the motor 3 detected by the resolver 43 are input to the inductance calculator 72. In STEP 53, based on these input values, the inductance L of the armatures of the motor 3 is calculated (estimated). More specifically, as shown in FIG. 5, the inductance calculator 72 has an Ld/Lq calculator 72a and an L calculator 72b, and the Ld/Lq calculator 72a determines the inductance Ld of the d-axis armature and the inductance Lq of the q-axis armature from the d-axis current command value Id_c and the q-axis current command value Iq_c, respectively. Then, from the determined inductances Ld and Lq and the rotational position θ, the inductance L of the armatures is determined.

FIG. 11 is a diagram for specifically explaining the processing of STEP 53 (processing carried out by the inductance calculator 72). Referring to FIG. 11, as shown by the graph denoted by reference numeral 402, the inductance L of the armature (a combination of the d-axis armature and the q-axis armature) of the motor 3 varies substantially sinusoidally between Ld and Lq with respect to the rotational position θm (rotational angle) of the output shaft 3a. Furthermore, the inductance Ld of the d-axis armature and the inductance Lq of the q-axis armature are related with the d-axis current Id and the q-axis current Iq as shown by the graphs denoted by reference numerals 400 and 401, respectively. Thus, in this embodiment, maps of the graphs denoted by reference numerals 400 and 401 are previously created. The inductance calculator 72 determines the inductances Ld and Lq from the input d-axis current command value Id_c and q-axis current command value Iq_c based on the maps 400 and 401, respectively. This calculation is a processing carried out by the Ld/Lq calculator 72a.

Then, the inductance calculator 72 calculates the inductance L from the inductances Ld and Lq determined as described above and the input rotational position θm according to the following Formula (2) (this formula is an approximate expression of the graph denoted by reference numeral 402 in FIG. 11).

[Formula 2]

$$L = \frac{Lq + Ld}{2} + \frac{Lq - Ld}{2} \cdot \cos 2\theta_m \quad (2)$$

The processing of STEP 53 (processing carried out by the inductance calculator 72) has been described above. Since the change of the inductance Ld is relatively small, a previously determined fixed value may be used as the inductance Ld. The inductance Lq may be determined using a map that is previously created using the torque command value Tr_c instead of the q-axis current command value Iq_c.

Following the STEP 53, the R calculator 73 of the temperature estimator 65 carries out the processing of STEP 54. As shown in FIG. 5, the inductance L determined by the inductance calculator 72 as described above, and the sampling values $I_1$, $I_2$ and $I_3$ obtained by the current measuring section 71 are input to the R calculator 73. The R calculator 73 calculates the coil resistance R from these input values as described below.

First, supposing that the armature of the motor 3 is a series circuit composed of the coil resistor R and the inductor L, and an instantaneous potential difference of the series circuit is represented by "E", a transient variation of the current I(t) (t: time) flowing through the armature is expressed by the following Formula (3).

[Formula 3]

$$I(t) = \frac{E}{R}\left(1 - e^{\frac{R}{L}t}\right) \quad (3)$$

Then, the both sides of the Formula (3) are differentiated with respect to time t, and the natural logarithm thereof is taken, resulting in the following Formula (4).

[Formula 4]

$$\ln \frac{dI}{dt} = \ln \frac{E}{L} - \frac{R}{L}t \quad (4)$$

If it is supposed that the sampling times of the current values $I_1$, $I_2$ and $I_3$ obtained in STEP 52 are represented by $t_1$, $t_2$ and $t_3$, respectively, and the interval Δt ($=t_2-t_1=t_3-t_2$) between the sampling times is sufficiently short, the following approximate Formulas (5) and (6) are derived from the Formula (4).

[Formula 5]

$$\ln \frac{I_2 - I_1}{\Delta t} = \ln \frac{E}{L} - \frac{R}{L} \cdot \frac{t_1 + t_2}{2} \quad (5)$$

[Formula 6]

$$\ln \frac{I_3 - I_2}{\Delta t} = \ln \frac{E}{L} - \frac{R}{L} \cdot \frac{t_2 + t_3}{2} \quad (6)$$

Then, subtraction between the respective sides of the Formulas (5) and (6) is performed, and then formula translation is performed, resulting in the following Formula (7).

[Formula 7]

$$R = -\frac{L}{\Delta t} \ln \frac{I_3 - I_2}{I_2 - I_1} \quad (7)$$

Thus, in this embodiment, the R calculator 73 calculates the coil resistance R from the input current values $I_1$, $I_2$ and $I_3$ and the inductance L according to the Formula (7). The time interval Δt, which is required for the calculation of the Formula (7), is a previously determined value (fixed value).

In this case, the current values $I_1$, $I_2$ and $I_3$ are values in the three-phase short-circuited state, and therefore, the current values vary stably during periods between the sampling times. Therefore, the coil resistance R can be determined by the Formula (7) with relatively high precision.

Then, the coil temperature calculator 74 carries out the processing of STEP 55 to calculate the coil temperature Tc. The coil resistance R calculated by the R calculator 73 as described above is input to the coil temperature calculator 74, and the coil temperature calculator 74 calculates the coil temperature Tc from the coil resistance R. In general, the coil resistance R varies with the temperature of the armature (coil temperature Tc) and is related with the coil temperature Tc according to the following Formula (8).

$$R = R_0 \cdot [1 + \alpha_c \cdot (Tc - T_0)] \quad (8)$$

In this formula, reference character $T_0$ denotes a predetermined reference temperature, and reference character $R_0$ denotes the value of the coil resistance R at the reference temperature $T_0$. Reference character $\alpha_c$ denotes a rate of change of the coil resistance R with respect to the temperature.

Thus, in this embodiment, the coil temperature calculator 74 calculates the coil temperature Tc from the input coil resistance R according to the following Formula (9), which is a translation of the Formula (8).

[Formula 8]

$$Tc = \frac{1}{\alpha_c} \cdot \left(\frac{R}{R_0} - 1\right) + T_0 \qquad (9)$$

The values $T_0$, $R_0$ and $\alpha_c$ required for the calculation of the Formula (9) are fixed values and previously stored in a memory (not shown).

In parallel with STEPS 52 to 55 described above, processings of STEPS 60 to 62 are carried out. STEP 60 is a processing carried out by the current feedback controller 61. In STEP 60, the current feedback controller 61 corrects the q-axis voltage command value Vq_c (which is determined from the difference ΔIq according to the feedback controlling rule) to compensate for an excess or deficiency of the output torque of the motor 3 in the three-phase short-circuited state with respect to the torque command value Tr_c. Specifically, if the absolute value of the short-circuit torque value TRQ1 is smaller than the absolute value of the torque command value Tr_c, the current feedback controller 61 increases the q-axis voltage command value Vq_c according to the deficiency. On the other hand, if the absolute value of the short-circuit torque value TRQ1 is larger than the absolute value of the torque command value Tr_c, the current feedback controller 61 increases the q-axis voltage command value Vq_c according to the excess. Thus, when the three-phase short-circuited state is released, and the normal PWM control is resumed, the output torque of the motor 3 can be quickly made to follow the torque command value Tr_c.

Then, the processing of STEP 61 is carried out by the Ke calculator 75. As shown in FIG. 5, to the Ke calculator 75, the rotational velocity ωm of the output shaft 3a determined by the rotational velocity calculator 51, the coil resistance R calculated by the R calculator 73, the inductance Ld of the d-axis armature determined by the inductance calculator 72, the detection values Id_s and Iq_s of the d-axis current and the q-axis current output from the three-phase/dq converter 54, and the q-axis voltage command value Vq_c determined by the current feedback controller 61 are input. The Ke calculator 75 calculates the induced voltage constant Ke from these input values in the following manner.

In general, there are relations expressed by the following Formulas (10) and (11) among the d-axis voltage Vd, the q-axis voltage Vq, the d-axis current Id and the q-axis current Iq of the armature 3.

$$Ke \cdot \omega m + R \cdot Iq = Vq - \omega m \cdot Ld \cdot Id \qquad (10)$$

$$Vd = R \cdot Id - \omega m \cdot Lq \cdot Iq \qquad (11)$$

Thus, in this embodiment, the Ke calculator 75 calculates the induced voltage constant Ke according to the following Formula (12), which is translated from the Formula (10).

$$Ke = (Vq - \omega m \cdot Ld \cdot Id - R \cdot Iq)/\omega \qquad (12)$$

In this case, as the values Vq, Ld, Id, Iq, R and ωm required for the calculation of the Formula (12), the q-axis voltage command value Vq_c, the rotational velocity ωm, the inductance Ld of the d-axis armature, the detection value Id_s of the d-axis current, the detection value Iq_s of the q-axis current, the coil resistance R, and the rotational velocity ωm input to the Ke calculator 75 are used.

Then, the magnet temperature calculator 76 carries out the processing of STEP 62 to calculate the magnet temperature Tm. The induced voltage constant Ke calculated by the Ke calculator 75 as described above and the rotor phase difference θd detected by the phase difference detector 44 are input to the magnet temperature calculator 76, and the magnet temperature calculator 76 calculates the magnet temperature Tm from these input values. In general, the induced voltage constant Ke varies with the temperature of the permanent magnets 13, 14 (magnet temperature Tm) and is related with the magnet temperature Tm according to the following Formula (13).

$$Ke = Ke_0 \cdot [1 + \alpha m \cdot (Tm - T_0)] \qquad (13)$$

In this formula, reference character $T_0$ represents a predetermined reference temperature, and reference character $Ke_0$ represents an induced voltage constant Ke at the reference temperature $T_0$ in the case where the rotor phase difference is the input rotor phase difference θd. Furthermore, reference character αm represents a rate of change of the induced voltage constant Ke with respect to temperature.

The induced voltage constant $Ke_0$ at the reference temperature $T_0$ is correlated with the rotor phase difference θd as shown by the graph of FIG. 12.

Thus, in this embodiment, the magnet temperature calculator 76 first determines the induced voltage constant $Ke_0$ from the input rotor phase difference θd (detection value). In this case, the correlation shown in FIG. 12 is previously mapped, and the induced voltage constant $Ke_0$ is determined from the rotor phase difference θd (detection value) based on the map. Then, the magnet temperature calculator 76 calculates the magnet temperature Tm from the determined induced voltage constant $Ke_0$ and the input induced voltage constant Ke according to the following Formula (14), which is translated from the Formula (13).

[Formula 9]

$$T_m = \frac{1}{\alpha_m}\left(\frac{Ke}{Ke_0} - 1\right) + T_0 \qquad (14)$$

The values $T_0$ and αm required for the calculation of the Formula (14) are fixed values and previously stored in a memory (not shown).

Details of the process involved with the temperature estimation according to the present invention have been described above.

Furthermore, while the processing by the current measuring section 71 is not carried out in an operational state of the motor 3 other than the three-phase short-circuited state in this embodiment, the R calculator 73 continuously outputs the value of the coil resistance R determined in the latest three-phase short-circuited state, for example. And, the processings by the coil temperature calculator 74, the Ke calculator 75, the magnet temperature calculator 76 and the inductance calculator 72 are sequentially carried out.

Magnet temperature estimating means according to the present invention is constituted by the processings carried out by the current FB controller 61, the PWM calculator 63 and the temperature estimator 65 according to the flowchart of FIG. 9.

As described above, according to this embodiment, it is determined whether or not demagnetization of the permanent magnets 13, 14 occurs, and if it is determined that demagnetization occurs, the rotor phase difference θd is adjusted to the phase difference θdb that provides a higher strength of the composite field. Thus, demagnetization of the permanent magnets 13, 14 can be prevented. Furthermore, the magnet temperature Tm used to determine whether demagnetization occurs or not is estimated based on the coil resistance R, which is calculated from the current detection value of one phase (the U phase in this embodiment) of the armature in the three-phase short-circuited state, and therefore, the magnet temperature Tm can be accurately estimated. Furthermore, since the magnet temperature Tm is used, it can be determined with high accuracy and reliability whether demagnetization occurs or not.

While the magnet temperature Tm is estimated as described above in this embodiment, the magnet temperature Tm or a substantially equivalent temperature may be detected by a temperature sensor. Similarly, the coil temperature Tc or a substantially equivalent temperature may be detected by a temperature sensor. In the case where these temperatures are detected, the short-circuit determining section 64 and the temperature estimator 65 may be omitted. Alternatively, one of the magnet temperature Tm and the coil temperature Tc (or a substantially equivalent temperature) may be detected, and the other temperature may be estimated using an appropriate model (heat transfer model) or the like.

Furthermore, while the demagnetization determining section 66 determines whether demagnetization occurs or not based on the magnet temperature Tm or the like in the embodiment described above, it may be determined whether demagnetization occurs or not based on a state quantity representing a field current component of the energizing current to the armature. Specifically, for example, the d-axis current command value Id_c or the detection value Id_s of the d-axis current is used as the state quantity representing the field current component, and the time in which the magnitude (absolute value) of Id_c or Id_s is equal to or higher than a predetermined value is measured. Then, if the measured time exceeds a predetermined length of time, it is determined that demagnetization occurs. If the measured time is equal to or less than the predetermined length of time, it is determined that demagnetization does not occur.

Alternatively, for example, the magnitude (absolute value) of the d-axis current command value Id_c or the detection value Id_s of the d-axis current, or a value proportional thereto, is integrated (accumulatively added), and if the integral value exceeds a predetermined value, it is determined that demagnetization occurs. And, if the integral value is equal to or less than the predetermined value, it is determined that demagnetization does not occur.

In general, the field produced by the d-axis current serves to weaken the composite field of the permanent magnets 13, 14. Therefore, in the manner described above, it can be appropriately determined whether demagnetization occurs or not.

What is claimed is:

1. A controller for a motor that has a first rotor, a second rotor, each of which produces a field by a permanent magnet, and an output shaft capable of rotating integrally with the first rotor of the rotors, which are coaxially disposed, said second rotor being capable of relatively rotating with respect to said first rotor, and the strength of a composite field of the fields of the permanent magnets of the rotors being capable of being changed by changing the phase difference between the rotors by the relative rotation of the second rotor, the controller comprising:

phase difference changing driving means that has an actuator that produces a driving force to make said second rotor relatively rotate with respect to said first rotor;

demagnetization determining means for determining whether or not demagnetization of the permanent magnets of said rotors occurs during operation of said motor; and rotor phase difference controlling means for controlling said phase difference changing driving means to change the phase difference between said rotors from a current phase difference to a phase difference that results in a higher strength of said composite field in a case where the result of determination by said demagnetization determining means is positive.

2. The controller for a motor according to claim 1, wherein said demagnetization determining means determines whether or not demagnetization of the permanent magnets of the rotors occurs at least based on state quantities representing the temperature of the permanent magnets of the rotors, the output torque of said motor, the rotational velocity of the output shaft of said motor and the phase difference between the rotors.

3. The controller for a motor according to claim 1, wherein said demagnetization determining means determines whether or not demagnetization of the permanent magnets of the rotors occurs at least based on a state quantity representing a field current component of an energizing current to an armature of said motor.

4. The controller for a motor according to claim 2, further comprising:

operational state determining means for determining whether or not the operational state of said motor is equivalent to the operational state in a case where it is supposed that armatures of said motor are short-circuited; and magnet temperature estimating means for estimating the temperature of the permanent magnets of said rotors from a detection value of an energizing current to said armatures while controlling an energizing circuit for the armatures to short-circuit the armatures of said motor in a case where the result of determination by the operational state determining means is positive, wherein said demagnetization determining means uses the value of the temperature of the permanent magnets estimated by the magnet temperature estimating means as a state quantity representing the temperature of the permanent magnets.

5. A method of controlling a motor via phase difference changing driving means, the motor having a first rotor, a second rotor, each of which produces a field by a permanent magnet, and an output shaft capable of rotating integrally with the first rotor of the rotors, which are coaxially disposed, said second rotor being capable of relatively rotating with respect to said first rotor, the strength of a composite field of the fields of the permanent magnets of the rotors being capable of being changed by changing the phase difference between the rotors by the relative rotation of the second rotor, and the phase difference changing driving means having an actuator that produces a driving force to make said second rotor relatively rotate with respect to said first rotor, the method comprising:

a demagnetization determining step of determining whether or not demagnetization of the permanent magnets of said rotors occurs during operation of said motor; and a rotor phase difference controlling step of controlling said phase difference changing driving means to change the phase difference between said rotors from a current phase difference to a phase difference that results in a higher strength of said composite field in a case where the result of determination in said demagnetization determining step is positive.

* * * * *